United States Patent
Khoury

(10) Patent No.: US 7,705,780 B1
(45) Date of Patent: Apr. 27, 2010

(54) ELECTRONIC SUPPORT MEASURES (ESM) TRACKING SYSTEM AND METHOD

(75) Inventor: Edward N. Khoury, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 193 days.

(21) Appl. No.: 11/960,926

(22) Filed: Dec. 20, 2007

(51) Int. Cl.
*G01S 5/02* (2006.01)

(52) U.S. Cl. ...................... 342/377; 342/417

(58) Field of Classification Search ......... 342/417–449, 342/377

See application file for complete search history.

(56) References Cited

U.S. PATENT DOCUMENTS

| | | | | |
|---|---|---|---|---|
| 5,144,595 | A * | 9/1992 | Graham et al. | 367/135 |
| 5,842,156 | A * | 11/1998 | Hong et al. | 342/159 |
| 7,132,961 | B2 * | 11/2006 | Yannone et al. | 340/961 |
| 2005/0001759 | A1 * | 1/2005 | Khosla | 342/195 |

OTHER PUBLICATIONS

S.D. Likothanassis, A real-time ARMA model structure identification method, 13th International Conference on Digital Signal Processing Proceedings, Jul. 1997.*

* cited by examiner

*Primary Examiner*—Thomas H Tarcza
*Assistant Examiner*—Fred H Mull
(74) *Attorney, Agent, or Firm*—Amy L. Ressing; L. George Legg; Keith J. Bae

(57) ABSTRACT

An ES tracker for tracking an emitter target, including ships and airborne targets, includes a sensor for receiving a signal emitted by the target; a sensor processor for processing the signal and outputting a measurement; and an information processor for processing the measurement. The information processor includes an IMM bearing filter having a mixing section for receiving the measurement and producing a mixed output signal; a first order Kalman filter for receiving the mixed output signal for stationary target tracking; a second order Kalman filter for receiving the mixed output signal and tracking bearing and bearing rate; and a third order Kalman filter for receiving the mixed output signal and tracking bearing, bearing rate, and bearing acceleration. The tracker may also include a second-order elevation filter for modeling and tracking elevation and elevation rate, and a first-order ESM parameters filter for adaptively estimating plant noise, modeling and tracking frequency, pulsewidth, and PRI of the emitter target.

32 Claims, 20 Drawing Sheets

ELECTRONIC SUPPORT MEASURES (ESM) TRACKING SYSTEM AND METHOD

FIELD OF THE INVENTION

This invention relates to the field of emitter target tracking, for example an airborne or ship emitter target, and more particularly to an Electronic Support (ES) tracker system and method employing Kalman filters as a basis for filtering and predicting an emitter bearing angle, Elevation angle, and ES parameters.

BACKGROUND OF THE INVENTION

Electronic Support Measures (ESM) are essential in tactical military operations. For example, airborne defense employing high speed tactical fighters requires fast and accurate target data, including bearing, range and heading, in an environment that typically includes multiple targets and clutter. Although present ESM data systems can provide fairly accurate input, the intermittent nature of the data causes significant track switching problems for closely spaced tracks. FIG. 1 illustrates this in the Area Defense context.

FIG. 2 shows a representative prior art airborne tracking system (tracker 10). A selected spatial region is continually scanned by system sensors that via a sensor processor convert the emitter signals to emitter measurements that are input to an information processor. The information processor is programmed to convert the data to kinematic equations, that is, into a form that quantifies a target emitter's position, velocity, and acceleration. An exemplary kinematic equation for predicting incoming measurements emitted by a target in a known state is:

$$x_{k+1} = A_k x_k + w_k; w_k \qquad \text{Eq. A}$$

where $x_k$ is a vector containing quantities of interest such as a target's position, velocity, and acceleration. Kinematic behavior in Eq. A is described by the transition matrix, $A_k$, and the plant noise term, $w_k$, which represents the kinematic uncertainty in the model. Incoming measurements emitted by a target can be predicted according to:

$$z_k = C_k x_k + v_k; v_k \qquad \text{Eq. B}$$

where $z_k$ are measurements and $v_k$ (sensor uncertainty index) captures the sensor uncertainty. Any typical tracking system employs these two equations. State measurements are generated for targets by iteratively filtering the target state and predicting the position of the next measurement, and comparing the estimated measurements with the actual measurements at the next scan. A deficiency with this approach is that the trajectory model is assumed known and constant. For example, when tracking radar reports, a second order trajectory model is typically used. However, if the target exhibits characteristics which are not consistent with the assumed second order model, either the target prediction will exhibit additional noise or the track will exhibit significant bias.

The simple Kalman filter is a typical such system, which assumes that the plant order associated with the trajectory is well known and constant. Although this assumption is valid for a 2 state trajectories with a consistently high data rate, i.e., everything looks approximately like a straight line if the data rate is high enough, the assumption is not valid for the Area Defense problem, illustrated in FIG. 1, due to it's intermittent nature.

Tracking involves receiving emitter signals from an airborne target and processing the signals in order to estimate the target's speed and position. A received signal includes noise that interferes with the processing and interpretation of the primary emitter signal and thereby corrupts the data. The problem is exacerbated when there are multiple emitters or targets, targets engaging in evasive maneuvers, or false or misleading detections.

Another approach described in U.S. Pat. No. 5,842,156, issued Nov. 24, 1998, Hong et al., is a target tracking system using multiresolution and multirate techniques. Data obtained from a target scanning region is reduced spatially and temporally to reduce the amount of data for processing. A deficiency with this approach is that it addresses this problem by assigning multiple data rates to filters associated with an Interactive Multiple Model (IMM) system to compensate for the possible lags due to the use of low order models in the IMM Kalman filter bank. This is commonly used approximation which attempts to linearize a nonlinear trajectory model.

It is therefore desirable to provide a tracking system with the added capability of identifying an emitter target and accurately providing its bearing, elevation, and ESM data. Such a tracking system provides not only the basis for prediction, but also the ESM control algorithm since ESM trajectory (or equivalently interferometer phase angle) and ESM parameters may be fed back to the front-end ESM system to provided adaptive gating in the target parameter space as well as aid the deinterleaving process.

BRIEF SUMMARY OF THE INVENTION

An Electronic Support (ES) tracker for tracking emitter targets, such as a ship or airborne target, includes a sensor for receiving a signal emitted by the target; a sensor processor for processing the signal and outputting a measurement; and an information processor for processing the measurement. The information processor includes an Interactive Multiple Model (IMM) bearing filter having a mixing section for receiving the measurement and producing a mixed output signal; a first order Kalman filter for receiving the mixed output signal for basic target tracking; a second order Kalman filter for receiving the mixed output signal and filtering bearing and bearing rate; and a third order Kalman filter for receiving the mixed output signal and tracking bearing, bearing rate, and bearing acceleration. The tracker may also include a second-order elevation filter for modeling and tracking elevation and elevation rate, and a first-order Electronic Support Measures (ESM) parameters filter for adaptively estimating plant noise, modeling and tracking frequency, pulsewidth, and pulse repetition interval (PRI) of the emitter target. It may further include a correlation, association, and score (likelihood) computation that uses mixed spatial and ESM parameter computations as a five dimensional space.

The invention is applicable to any number of higher-order filters operating in parallel and therefore is applicable to any linear or non-linear trajectory emitter tracking situation. Another unique feature of this tracker is that it includes all parameters (bearing, elevation, and ESM parameters) in the likelihood and decision process for correlation and association of new reports with existing tracks. In addition, it includes a new technique developed for determining plant noise in the ESM parameters filter estimates plant noise as a function of ESM parameter agility.

DETAILED DESCRIPTION OF THE INVENTION

Initially, it should be noted that although one 3-state plant model will suffice, there are significant drawbacks here. Bearing estimates for stationary emitters will be significantly more noisy, according to:

$$X(n+1)=X(n)+V(n)*T+\frac{1}{2}*A(n)*T^2$$

Although both V and A are zero in this case, these must be estimated as such and the additional noise propagates into the bearing estimate as may be seen in the above. This requires larger than necessary Bearing/Elevation windows and increases the chance for track switching and additional confusion.

Figure 3:
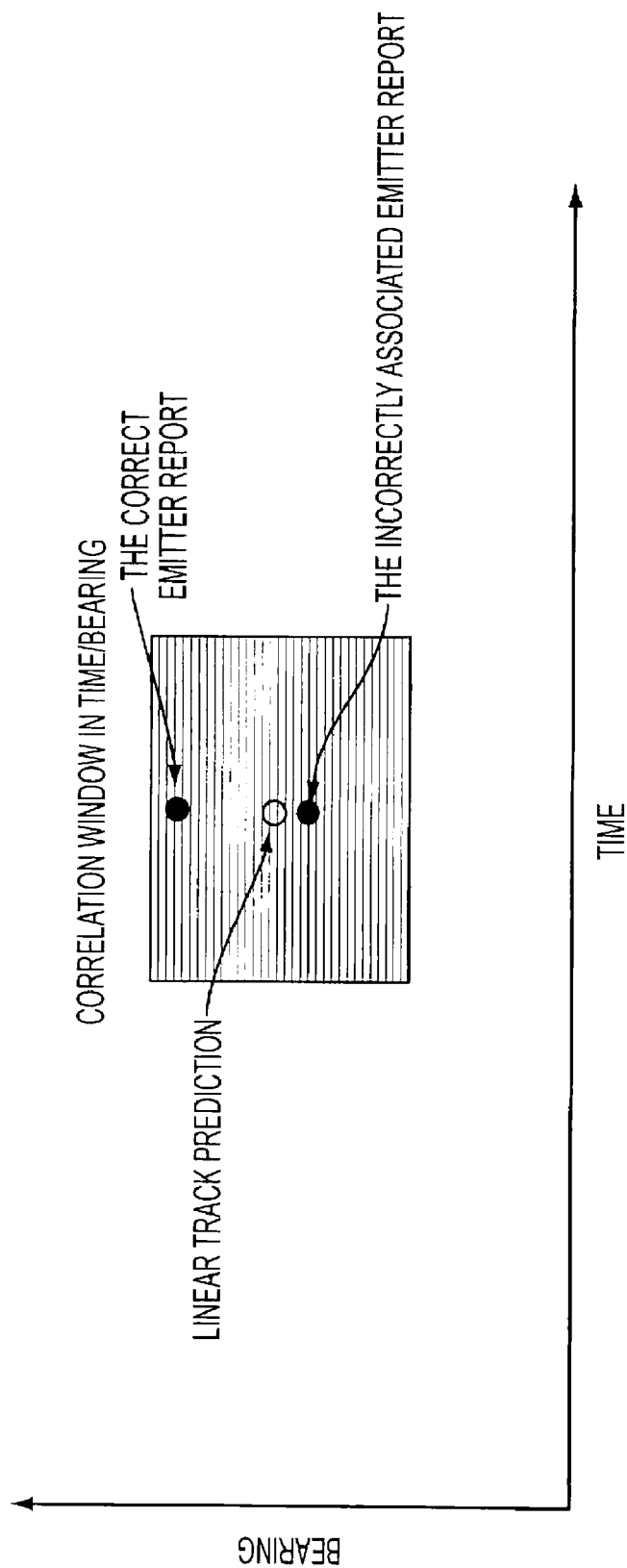
FIG. 3 is a graph illustrating the correlation problem in ESM tracking.

Correlation reduces the number of association possibilities by removing remote possibilities. Emitter Reports that fall within the correlation window are considered candidates for report/track association. Complications include that multiple emitter reports and tracks may fall within the same window (similar closely spaced emitters); emitter reports may be associated with more than one track; incorrect Plant models add to the confusion; accomplished by Statistical Distance testing and Physical Windowing, the latter of which is illustrated in FIG. 3.

If more than one emitter falls within the track gate, or if one or more emitters fall within several track gates, an association rule must be applied to complete the process. The optimal rule, to keep over all time, all possible track-emitter report combinations and start tracks on all possibilities, is in practice unfeasible because it is another exponential growth solution. Possible reduced association rules include: nearest geometric distance over the current measurement set; nearest statistical distance over the current measurement set; Maximum Likelihood on a track-by-track basis over the current measurement set; Maximum Likelihood over all tracks over the current measurement set; and Maximum Likelihood over all tracks and several measurement sets, which itself leads to additional Multiple-Hypothesis/Bifurcation/Pruning schemes.

Figure 4:
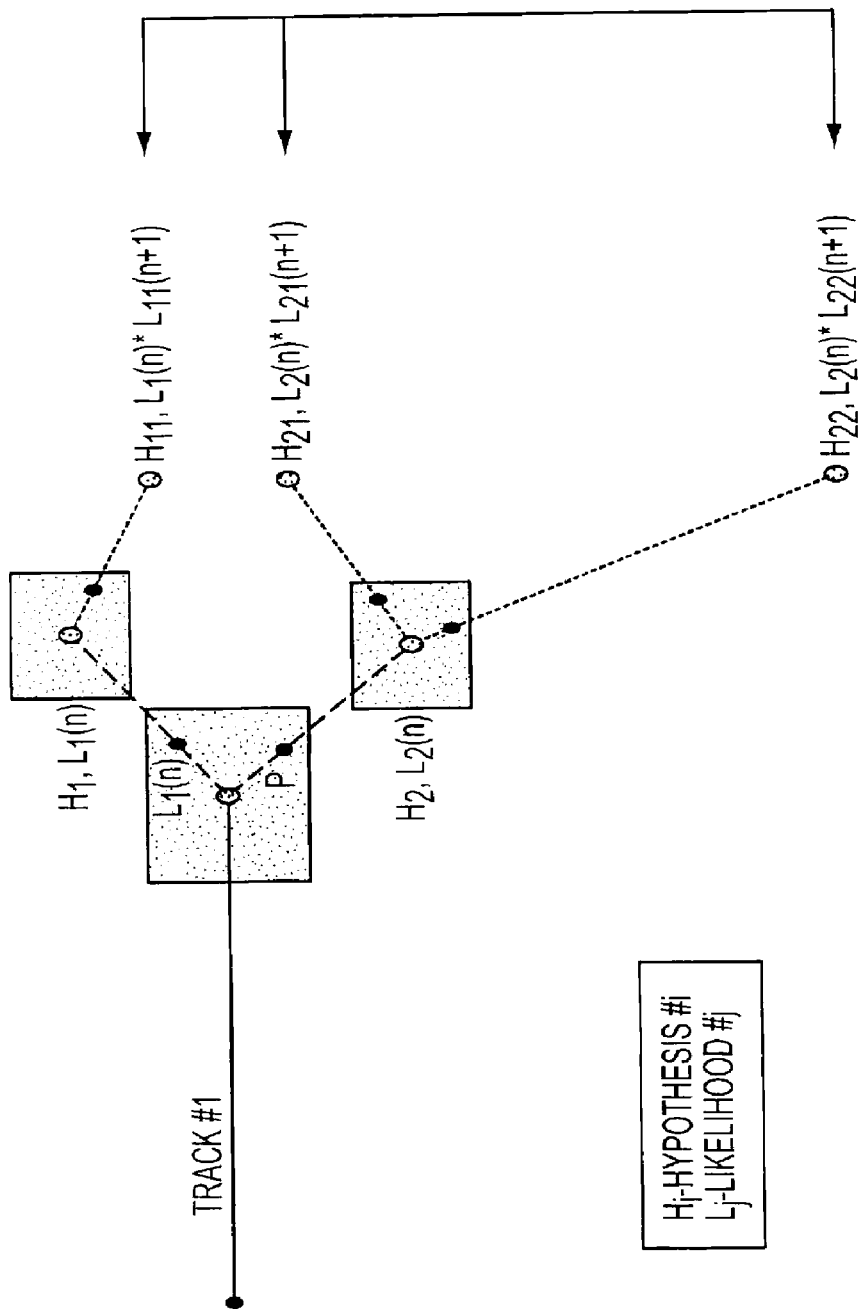
FIG. 4 is a graph illustrating the pruning approach in Multiple Hypothesis ESM tracking
Figure 5:
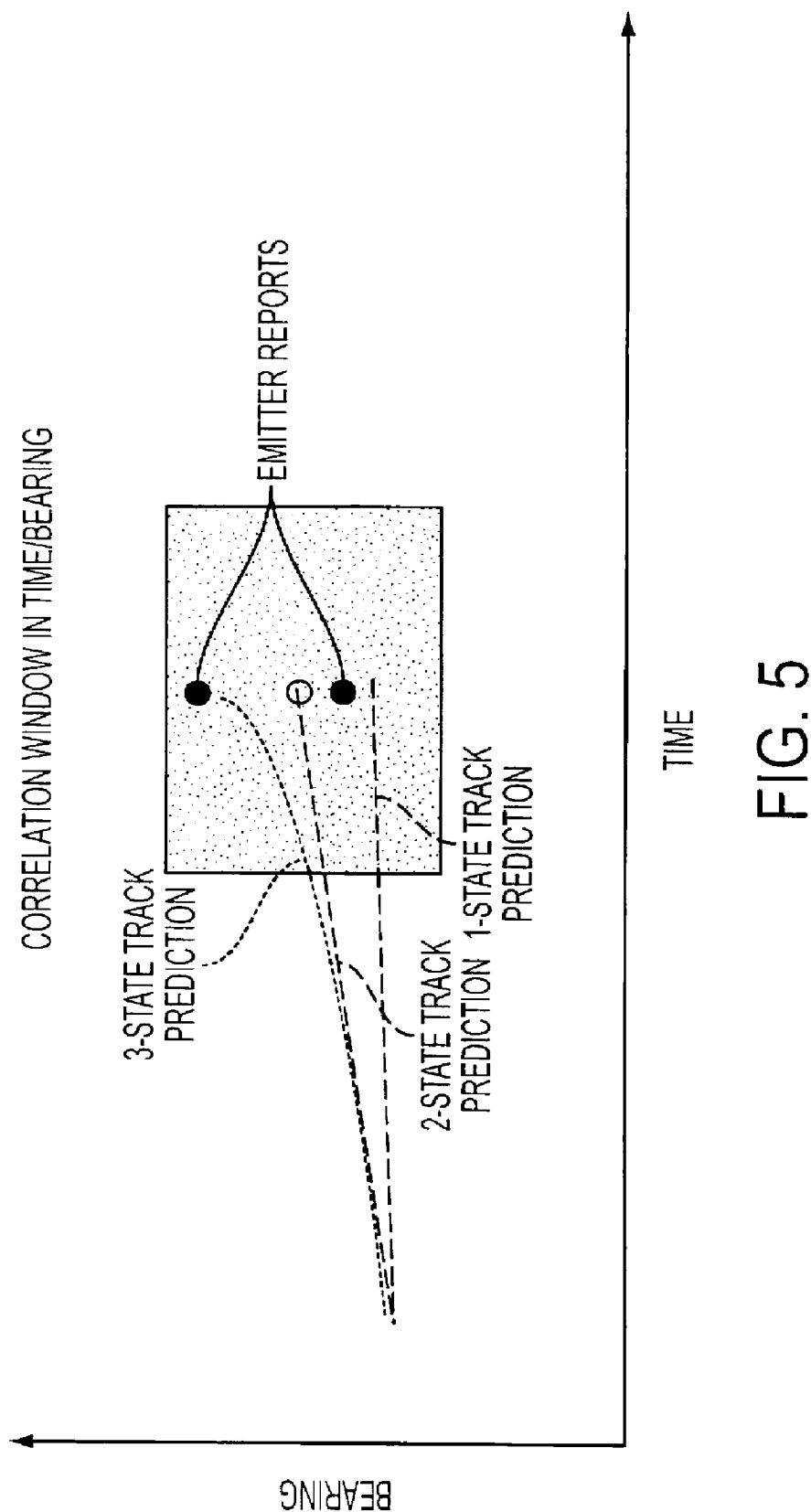
FIG. 5 is a graph illustrating association process failure in ESM tracking.

Pruning provides realistic approximations to the multiple hypothesis problem via hypothesis reduction. Referring now to FIG. 4, pruning involves keeping all possible paths for 'n' updates and prune when n=1, similar to the Track Bifurcation approach. As shown, the Largest Likelihood product is selected, with other branches being pruned, and re-normalized. There is, however, a relationship between plant order and probability of correct association. FIG. 5 illustrates that if the wrong plant model is used, the association process is likely to fail for highly non-linear or higher order models where data is sampled at a lower rate.

The invention is based on the theory associated with the Interactive Multiple Model (IMM) filter originally developed by Blom and Bar-Shalom and documented in the following articles incorporated herein by reference: Henk A. P. Blom, "An efficient Decision-Making-Free-Filter for Processes with Abrupt Changes ," IFAC Symp. on Identification and System Parameter Estimation, York, United Kingdom, July 1985; and, Henk A. P. Blom, "The Interacting Multiple Model Algorithm for Systems with Markovian Switching Coefficients," IEEE Trans. on Automatic Control, Vol. AC-33, No. 8, August 1988, pp. 780-783. IMM processing is also described in U.S. Pat. No. 7,132,961, Yannone et al., issued Nov. 7, 2006, incorporated herein by reference.

The IMM is a multiple plant model filter which uses a Hidden Markov model to adaptively determine the appropriate plant model from a prescribed set (uses a bank of Kalman filters with track merging based on the MARKOV state probabilities). The IMM filter uses track merging to reduce the possible emitter paths and prevent exponential growth. Multiple-Hypothesis IMM filtering allows simpler Association rules to work well; it considerably lowers algorithm complexity and database requirements; and, although more computationally complex, IMM filters are ideally suited for parallel processing architectures which if used effectively negates the required additional processing time.

Figure 1:
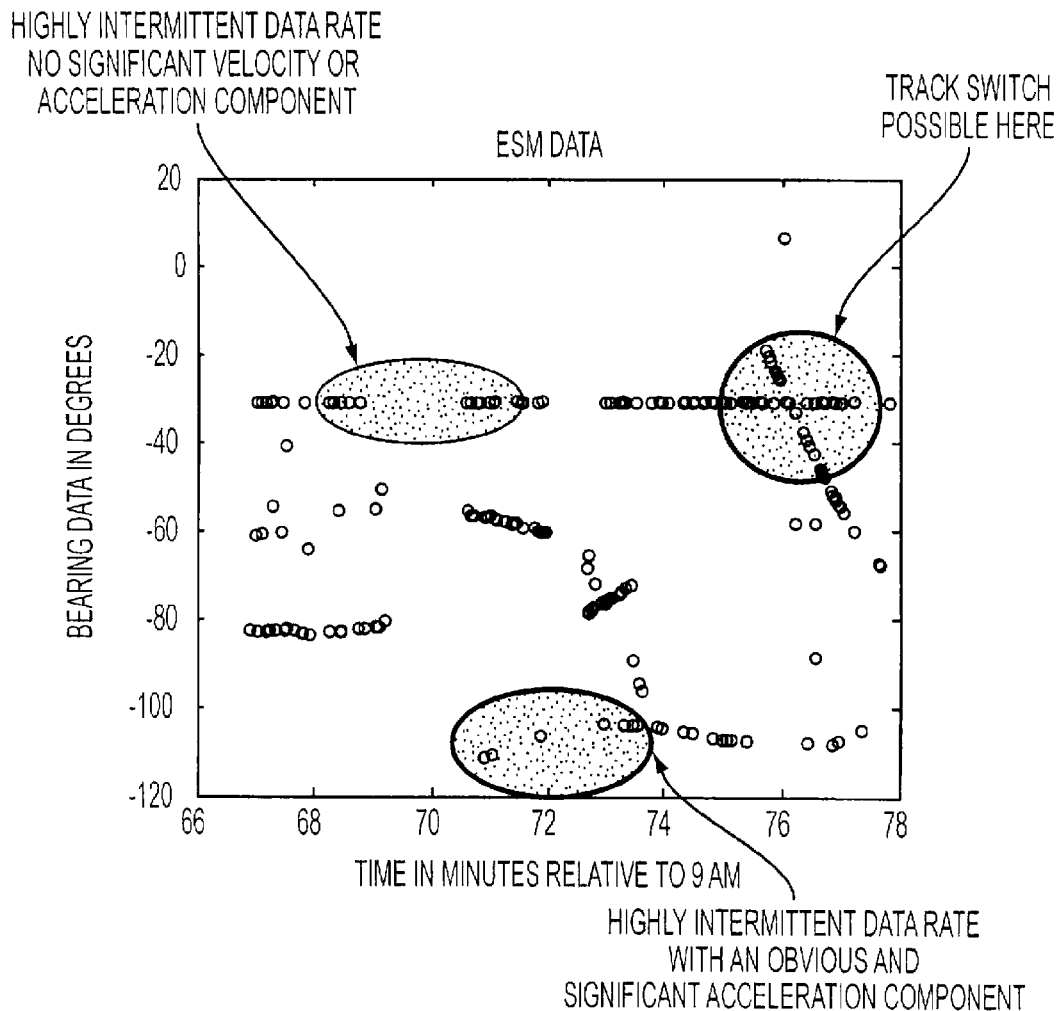
FIG. 1 is a graph of collected real-time data illustrating a problematic tracking scenario.
Figure 2:
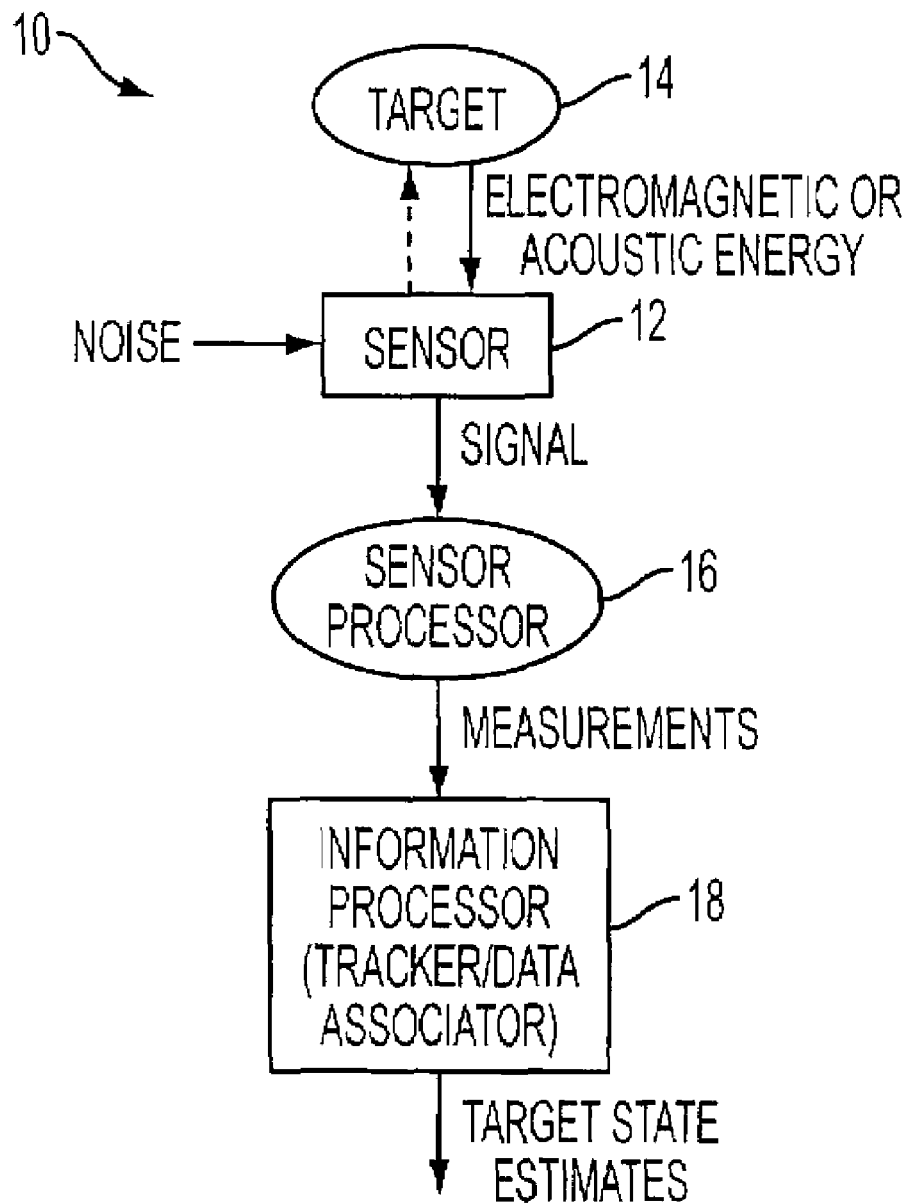
FIG. 2 is a prior art tracking system.

Referring again to FIG. 2, an initial scan and sensing of target data is provided to the tracker 10, that initializes and generates a prediction of the next target position. Tracker 10 includes a plurality of sensors 12 for acquiring EM or acoustic energy emitted by an emitter target 14, e.g. a ship or airborne emitter target. The sensors provide the emitted signal pickup to a sensor processor 16 that converts the signal to a measurement, which is input to an information processor 18. More particularly, data from the initial scan is processed, the sensed data from subsequent scans, that is raw data or fine resolution data, is subject to gating. Gating is a measurement sifting procedure for eliminating measurements that are unlikely to have originated from targets based on the information at hand. In order to gate data, a normalized distance for each raw data point is determined by dividing the distance between the raw data measurement and the point predicted as the next measurement by a calculated uncertainty factor. All raw data that is greater than a preselected distance from the predicted next target position is eliminated from further consideration. The gating on a 2-dimensional space with a preselected threshold is equivalent to placing an ellipse on the 2-dimensional space with the center of the ellipse located at the predicted measurement, and accepting only those measurements that fall into the ellipse as the potential measurements for further processing.

Figure 6:
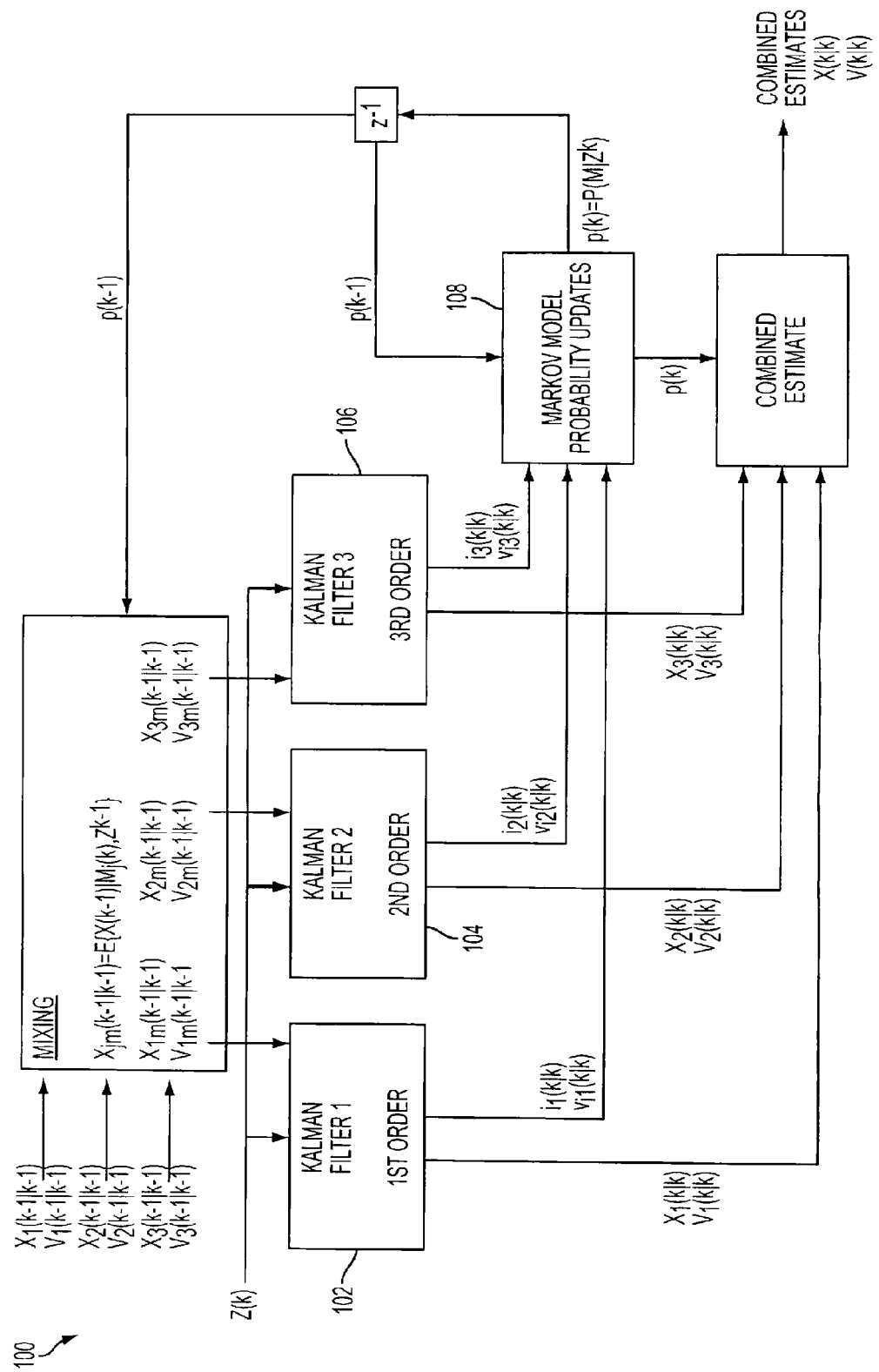
FIG. 6 is an ESM Bearing angle tracker according to the invention.

Referring now to FIG. 6, the invention is a combination of the conventional tracker 10 and an Interactive Multiple Model (IMM) bearing filter 100 that utilizes three Kalman filters 102, 104, and 106 of different orders, first order, second order, and third order, respectively, to track emitter bearing angle. The IMM bearing filter 100 uses standard Kalman filters as a basis for filtering and predicting emitter bearing angle. Filter selection for the IMM is based on the expected variation of emitter trajectories and the imposed spherical coordinate system. The derivation of the IMM is well documented, and the preferred embodiments of the invention are as follows.

IMM Bearing Filter Implementation

The IMM bearing filter update consists of the following steps:

1. IMM bearing filter initialization, which consists of IMM and Kalman filter initialization.
2. The IMM track update process, which consists of state estimator mixing (interaction), Kalman filter updates, model probabilities update, and combining or merging of the three state estimates.

These are as follows.

IMM Bearing Filter Initialization

The IMM bearing filter assumes a hidden Markov model that controls trajectory model switching with a switching probability that is assumed known. This transition matrix is defined as $$P_{ij} = [p_{ij}] \quad (1)$$

where the transition probabilities are $$p_{ij} = \text{Prob}\{M_j(k)|M_i(k-1)\}, \quad i,j=1,2,3 \quad (2)$$

and $M_j(k)$ stands for "model j in effect during the period ending at time k."

The above expression should be interpreted as the probability that the trajectory model for the track at time k equals model j given that at the previous update, the trajectory model was i where (i,j) range from 1 to 3. For example, in the model, the three elements in the first row of the matrix indicate the transition probability from the bearing-only model to the bearing-only model (the 1,1 element), to the second-order model (the 1,2 element), and to the third-order model (the 1,3 element), respectively. The second and third rows should be interpreted in a similar manner.

The IMM bearing filter initializes this Markov model transition matrix as $$P_{ij} = \begin{bmatrix} p_{11} & (1-p_{11})/2 & (1-p_{11})/2 \\ (1-p_{22})/2 & p_{22} & (1-p_{22})/2 \\ (1-p_{33})/2 & (1-p_{33})/2 & p_{33} \end{bmatrix} \quad (3)$$

This matrix is initialized, for example by setting $$\begin{bmatrix} p_{11} \\ p_{22} \\ p_{33} \end{bmatrix} = \begin{bmatrix} .90 \\ .95 \\ .90 \end{bmatrix}. \quad (4)$$

The transition probability $p_{11}$ should be interpreted as the probability that the first-order model transitions to itself (or stays a first-order model) during the bearing track update process. Due to the form of the matrix specified above, there is also a small and equal probability that the current first-order platform model will transition to the second-order or third-order models during track update. The two remaining transition probabilities, $p_{22}$ and $p_{33}$, should be interpreted in a similar manner. We note that the model gives preference to the second-order bearing filter by setting the return probability to a slightly higher value. Thus, a track that is second-order (maintains bearing and bearing rate) is more likely to stay second-order during the track update process than a first- or third-order track.

The initial probability distribution associated with the three trajectory models (hereafter referred to only as models) is also assumed known. In the model, this initial distribution is given by $$p_j = \begin{bmatrix} p_1 \\ p_2 \\ p_3 \end{bmatrix} \quad (5)$$

where this vector is initialized to $$p_j = \begin{bmatrix} .05 \\ .85 \\ .10 \end{bmatrix}. \quad (6)$$

Again, the model gives preference to initiating second-order tracks. The assoc_f routine correlates current cluster descriptors (emitter reports) with prior emitter reports that have been previously stored and that have not correlated with existing tracks (defined as first points). An emitter report is equivalent to an ES contact consisting of extracted information from a set of post-processed Pulse Descriptor Words (PDWs). If a correlation exists in the appropriate parameter space, a new tentative bearing track is initiated. Although the transition matrix is a constant, the model probabilities are updated on each track update as discussed below.

IMM Track Update Process

Computations associated with the IMM track update process are as follows.

State Estimator Mixing (Interaction) and State Prediction

For any initiated track, once an associated contact is identified, the first step in the IMM bearing update process is mixing the previous filter estimates stored in the track file. This process is known as mixing, or interaction, and allows the IMM to achieve the accuracy associated with a second-order generalized pseudo-Bayesian (GPB2) filter [4] while maintaining three rather than nine separate Kalman filters. The 3×3 mixing probability matrix is given by $$P_{i|j} = [p_{i|j}] = \begin{bmatrix} \frac{p_{11}}{\bar{c}_1} \cdot p_1 & \frac{p_{12}}{\bar{c}_2} \cdot p_1 & \frac{p_{13}}{\bar{c}_3} \cdot p_1 \\ \frac{p_{21}}{\bar{c}_1} \cdot p_2 & \frac{p_{22}}{\bar{c}_2} \cdot p_2 & \frac{p_{23}}{\bar{c}_3} \cdot p_2 \\ \frac{p_{31}}{\bar{c}_1} \cdot p_3 & \frac{p_{32}}{\bar{c}_2} \cdot p_3 & \frac{p_{33}}{\bar{c}_3} \cdot p_3 \end{bmatrix}, \tag{7}$$

where $\bar{c}$ is a 3×1 normalizing constant given by $$\bar{c} = \begin{bmatrix} \bar{c}_1 \\ \bar{c}_2 \\ \bar{c}_3 \end{bmatrix} = P'_{ij} p_j \tag{8}$$

and $P'_{ij}$ is the complex conjugate transpose of $P_{ij}$.

Using the above mixing probabilities, the mixed filter estimates are obtained as $$\hat{x}_j^m(k) = \sum_i \hat{x}_i(k) p_{i|j}(k), \tag{9}$$

where $\hat{x}_j^m(k)$ is the mixed estimate for model j, $\hat{x}_i(k)$ is the $i^{th}$ filtered estimate (i,j=1,2,3) obtained from the track file, and $p_{i,j}$ are the mixing probabilities defined above. The associated scalar covariances are given by $$v_j^m(k) = \sum_i p_{i|j}(k) \{v_i(k) + [\hat{x}_i(k) - \hat{x}_j^m(k)][\hat{x}_i(k) - \hat{x}_j^m(k)]'\}. \tag{10}$$

It should be noted that for j=1, both $\hat{x}_1^m(k)$ and $v_1^m(k)$ are 1×1 or scalars. For j=2,3, this is not the case. Since, in general, the filter estimates vary in size from 1×1 for the first-order filter to 3×1 for the third-order filter, mixing the track file estimates is not straightforward. Before computing the above mixing equations, it is necessary to resize the filter estimates and their associated covariance to appropriate sizes for mixing. This can be called upsizing and downsizing. For example, assume that the form of the track file estimate and covariance for the third-order filter may be written as $$\hat{x}_3(k) = \begin{bmatrix} \hat{x}_3^{(1)}(k) \\ \hat{x}_3^{(2)}(k) \\ \hat{x}_3^{(3)}(k) \end{bmatrix} = \begin{bmatrix} \hat{b}_3(k) \\ \hat{\dot{b}}_3(k) \\ \hat{\ddot{b}}_3(k) \end{bmatrix} \text{ and} \tag{11}$$

$$v_3(k) = \begin{bmatrix} v_3^{(1,1)}(k) & v_3^{(1,2)}(k) & v_3^{(1,3)}(k) \\ v_3^{(2,1)}(k) & v_3^{(2,2)}(k) & v_3^{(2,3)}(k) \\ v_3^{(3,1)}(k) & v_3^{(3,2)}(k) & v_3^{(3,3)}(k) \end{bmatrix} \tag{12}$$

where $\hat{b}(k)$ is the filtered bearing estimate.

Downsizing is simply the elimination of the appropriate row and column before mixing. Downsizing the third-order filter for mixing to obtain a mixed first-order estimate is accomplished by defining the intermediate downsized third-order filter estimate as $$\hat{x}_{31}^d(k) = [\hat{x}_3^{(1)}(k)] \tag{13}$$

and associated covariance as $$v_{31}^d(k) = [v_3^{(1,1)}(k)]. \tag{14}$$

Upsizing in the implementation implies the addition of zero elements to expand the filter estimate and associated covariance for mixing. Consider the j=3 case above. Both the first- and second-order filters require upsizing before the mixing process. To upsize the first-order filter, an intermediate vector is defined as $$\hat{x}_{13}^u(k) = \begin{bmatrix} \hat{x}_1(k) \\ 0 \\ 0 \end{bmatrix} \tag{15}$$

and the associated 3×3 upsized covariance is defined as $$v_1^u(k) = \begin{bmatrix} v_1(k) & 0 & 0 \\ 0 & 0 & 0 \\ 0 & 0 & 0 \end{bmatrix}. \tag{16}$$

Similarly, the second-order filter is upsized to $$\hat{x}_{23}^u(k) = \begin{bmatrix} \hat{x}_2^{(1)}(k) \\ \hat{x}_2^{(2)}(k) \\ 0 \end{bmatrix} \tag{17}$$

and the associated 3×3 upsized covariance is defined as $$v_{23}^u(k) = \begin{bmatrix} v_2^{(1,1)}(k) & v_2^{(1,2)}(k) & 0 \\ v_2^{(2,1)}(k) & v_2^{(2,2)}(k) & 0 \\ 0 & 0 & 0 \end{bmatrix}. \tag{18}$$

All other upsizing and downsizing are handled in a similar manner.

Kalman Filter Updates

The three Kalman filters 102, 104, and 106 are basically subroutines for the IMM bearing filter. Therefore, Kalman filter updates may be performed by passing in the bearing data and the mixed estimates $\hat{x}_j^m(k)$ and their covariance $v_j^m(k)$ in lieu of the normal track file values, as shown in FIG. 6. The corresponding output of the Kalman filters for time k are defined as $\hat{x}_j(k)$ and $v_j(k)$, respectively. These outputs are used for merging the estimates using the updated model probabilities. These values are also saved in the track file along with the merged estimate and its covariance. In addition, each of the three Kalman filters sends back the innovation sequence and its covariance, which are used for the update of model probabilities.

Update of Model Probabilities

The model probabilities are updated in two steps. First, the likelihood associated with each of the filter updates is computed. This likelihood is defined as $$\Lambda_j(k) = P\{z(k) | M_j(k) . Z^{k-1}\}, \quad (19)$$

where $z(k)$ is the current bearing measurement from the associated contact and $Z^{k-1}$ is a vector representing all the data through time k−1. This may be computed as $$\Lambda_j(k) = \frac{\exp\left\{-\frac{1}{2}(\gamma'_j S_j^{-1} \gamma_j)\right\}}{\{det[2\pi S_j]\}^{1/2}}, \quad (20)$$

where $\gamma_j$ is the innovation obtained during the update of the $j^{th}$ Kalman filter and $S_j$ is its associated covariance. Since the dimensionality of $S_j$ is always equal to the dimensionality of the measurement space, $S_j$ is always a scalar and the inverse indicated above never needs to be computed. Therefore, the above may be simplified to $$\Lambda_j(k) = \frac{\exp\left\{-\frac{1}{2S_j}(\gamma'_j \gamma_j)\right\}}{\sqrt{(2\pi)(S_j)}}. \quad (21)$$

Based on the likelihoods defined above, the updated model probabilities may be computed as $$p_j(k) = \frac{\Lambda_j(k) \bar{c}_j}{c}, \quad (22)$$

where a second normalizing constant is defined as $$c = \sum_j \Lambda_j(k) \cdot \bar{c}_j \quad (23)$$

and $\bar{c}_j$ was previously defined.

Merging the State Estimates

The merged estimates and associated covariance is obtained by computations similar to that discussed above for mixing. The merged minimum mean-squared error (MMSE) filter estimate is given by $$\hat{x}(k) = \sum_i \hat{x}_i(k) p_i(k) \quad (24)$$

and its associated covariance by $$v(k) = \sum_i p_i(k-1)\{v_i(k) + [\hat{x}_i(k) - \hat{x}(k)][\hat{x}_i(k) - \hat{x}(k)]'\}, \quad (25)$$

where the individual estimates and their covariance must be upsized and downsized appropriately as discussed further herein. The correlation and association process uses the estimates associated with the individual filters.

The Single-State Bearing Filter

The bearing filter 102 is a first-order Kalman filter. The filter's general equation corresponds to an alpha filter and is given by $$\hat{x}_1(k) = \Phi_1(k,k-1)\hat{x}_1(k-1) + K_1(k)[z(k) - H_1(k)\Phi_1(k,k-1)\hat{x}_1(k-1)], \quad (26)$$

where the subscript indicates the first-order filter. For the first-order bearing filter 102 we define $$\hat{x}_1(k) = [\hat{b}_1(k)], \quad (27)$$

$$\Phi_1(k,k-1) = [1], \quad (28)$$

$$z(k) = b_m(k), \quad (29)$$

and $$H_1(k) = [1]. \quad (30)$$

In the above, $\hat{x}_1(k-1)$ is the 1×1 vector of filtered bearing estimates valid at time (k−1) from the previous iteration and valid before the current bearing data is received. Time (k−1) is the last time the track was updated (time of previous cluster update), and time k is the current cluster measurement time. $z(k) = b_m(k)$ is the bearing angle measurement from the current emitter report. $\Phi_1(k,k-1)$ is a 1×1 state or plant transition model and describes the emitter motion from time segment (k−1) to k. $H_1(k)$ is a 1×1 measurement transformation vector, and due to the form of $H_1$, $K_1(k)$ is a 1×1 vector of Kalman gain coefficients that weight the measurement residuals.

The above general equation for the filter update (Eq. 26) may also be simplified by introducing the predicted estimates and the predicted measurement terms. In terms of the predicted estimates, the general form of the filter equation may be written as $$\hat{x}_1(k) = \hat{x}_1(k,k-1) + K_1(k)[z(k) - H_1(k)\hat{x}_1(k,k-1)], \quad (31)$$

where $$\hat{x}_1(k,k-1) = \Phi_1(k,k-1)\hat{x}_1)(k-1) = \hat{b}_1(k,k-1) \quad (32)$$

and $\hat{b}_1(k,k-1)$ is defined as the predicted bearing. Defining the predicted measurement as $$\hat{z}_1(k,k-1) = H_1(k)\hat{x}_1(k,k-1) = \hat{b}_1(k,k-1) \quad (33)$$

allows the final form of the general Kalman filter equation to be written in compact form as $$\hat{x}_1(k) = \hat{x}_1(k,k-1) + K_1(k)[z(k) - \hat{z}_1(k,k-1)]. \quad (34)$$

Due to the form of $H_1$ above, the form of the Kalman gain equation is recognized as 1×1. Taking this into account and expanding the above yields one simple filter equation for bearing:

$$\hat{b}_1(k) = \hat{b}_1(k,k-1) + K_1(k) \cdot [b_m(k) - \hat{b}_1(k,k-1)]. \quad (35)$$

The sequence $\gamma_1(k) = z(k) - \hat{z}_1(k,k-1)$ is known as the innovation sequence and represents the new information to the filter. This term is also passed up to the IMM bearing filter for model probability updates. Finally, expanding the predicted estimate defined as $\Phi_1(k,k-1)\hat{x}_1(k-1)$ yields the expansion for the filter predictions as $$\bar{b}_1(k,k-1) = \bar{b}_1(k-1). \tag{36}$$

Initialization

The single-state bearing angle Kalman filter 102 may be initialized using one of two equivalent methods.

Method 1

In this method, the bearing filter 102 is initialized with a large variance:

$$\hat{x}(0) = 0 \text{ and } v_1(0) = 10^{12}, \tag{37}$$

where $v_1(0)$ is the initial 1×1 filtered covariance value. A large covariance value simply indicates no a priori information and, therefore, large uncertainty.

Method 2

In this method, the bearing filter 102 is initialized from the first cluster measurement of bearing angle. In this case we define $$\hat{x}_1(1) = b_m(1) \text{ and } v_1(1) = v_{mc}(1), \tag{38}$$

where $b_m(1)$ is the bearing measurement provided with the first cluster and $v_{mc}(1)$ is the computed measurement variance associated with the same bearing measurement discussed further herein. The first measurement is used to initialize the filter and the filter iteration starts at time k=2 with the second measurement while, in Method 1, the iteration starts at time k=1 with the first measurement.

Predicted Estimate

When a new measurement is associated with the bearing track, the first step in the filter update process requires that the track file estimate be predicted to the time of the current associated measurement (time alignment). For the bearing filter, the predicted estimate is obtained from the transition matrix defined above (Eq. 28), the filtered estimate $\hat{x}_1(k-1)$ from the previous track file update, and the time difference between the associated contact and the track file time (time of the last track update) as $$\hat{x}_1(k,k-1) = \Phi_1(k,k-1)\hat{x}_1(k-1) \tag{39}$$

or, equivalently, $$\bar{b}_1(k,k-1) = \bar{b}_1(k-1), \tag{40}$$

where the 1×1 vector $\hat{x}_1(k,k-1)$ is the prediction of $\hat{x}_1(k-1)$ to the current emitter report time and $\hat{x}_1(k-1)$ is the previous filtered estimate obtained from the track file.

Predicted Variance and Plant Noise Estimates

Once the prediction is computed, computation of the Kalman filter gain is required to merge the bearing emitter report data with the bearing angle of a track. The Kalman gain computation requires an estimate of the predicted variance and the measurement variance. The 1×1 predicted variance is given by $$v_1(k,k-1) = v_1(k-1) + \tilde{v}_1(k), \tag{41}$$

where $\tilde{v}_1(k)$ is the 1×1 plant noise estimate and $v_1(k-1)$ is obtained from the track file. For the bearing filter, the plant noise is set to $$\tilde{v}_1(k) = b_1^{(a)}(k) \cdot w_1^{(a)} \cdot b_1^{(a)}(k)', \tag{42}$$

where $$b_1^{(a)}(k) = 1. \tag{43}$$

$w_1^{(a)}$ is a constant and should be approximately set to $$w_1^{(a)} = 0.1\pi/180/40 \approx 0.00005. \tag{44}$$

Therefore, $$\tilde{v}_1(k) = 0.00005. \tag{45}$$

As a final note, $w_1^{(a)}$ is a tuning parameter that controls filter bandwidth and should be optimized during testing.

Filter Gain and Measurement Noise Estimate

The 1×1 Kalman gain $K_1$ is given by $$K_1(k) = \frac{v_1(k, k-1)H_1'}{H_1 v_1(k, k-1) H_1' + v_{mc}(k)}. \tag{46}$$

We note here that a simple divide is used and that no matrix inverse operation is required since the term $H_1 v_1(k,k-1)H'_1$ is a scalar. However, to compute this gain, an estimate of emitter report bearing measurement noise is required. If the emitter report bearing measurement noise is not included in the cluster message it can be computed from the single pulse specification variance according to the following equation:

$$v_{mc}(k) = \frac{v_m(k)}{n}, \tag{47}$$

where the variable $v_{mc}(k)$ is the measurement noise variance in bearing associated with the cluster estimate. The variable $v_m(k)$ is the single pulse measurement accuracy (equivalent to the PDW accuracy) of the bearing angle, and n is the number of pulses reported in the emitter report message. For the bearing estimate, the measurement accuracy is a function of frequency, SNR, and measured emitter bearing angle. These features must be represented as such in a suitable tabular format. This representation should be obtained from system testing and should follow the form $$v_m(k) = \left(\sigma_a \frac{f_0}{f_m(k)}\right)^2, \tag{48}$$

where $\sigma_a$ should be characterized and is the base bearing accuracy, which is a function of measured emitter bearing angle, and $f_0$ is the constant frequency at which $\sigma_a$ is measured. The term $f_m(k)$ is the frequency measurement associated with the bearing angle provided in the cluster descriptor. $v_m(k)$ should be inversely proportional to SNR and limited to a constant that represents best-case bearing accuracy.

The actual value of $\sigma_a$ must be obtained from system measurements and testing and used here if reliable tracking is to be expected. This same comment applies to the elevation filters. Note also that $\sigma_a$ should be an over-bounded approximate estimate of accuracy in bearing angle as a function of frequency and measured bearing angle.

The Kalman gain may also be written in terms of the covariance of the innovation sequence as $$K_1(k) = \frac{v_1(k, k-1)H_1'}{S_1(k)}, \quad (49)$$

where $S_1(k)$ is the scalar covariance of the innovation sequence defined above and is given by the equation $$S_1(k) = H_1 v_1(k,k-1) H_1' + v_{mc}(k). \quad (50)$$

This term is also passed up to the IMM bearing filter for model probability updates.

The Filtered Estimate

After the Kalman gains are computed, the new filtered or track estimate is given by $$\hat{x}_1(k) = \hat{x}_1(k,k-1) + K_1(k)\{z(k) - \hat{z}_1(k,k-1)\} \quad (51)$$

or $$\hat{x}_1(k) = \hat{x}_1(k,k-1) + K_1(k)\gamma_1(k) \quad (52)$$

where $\hat{x}_1(k)$ is the filtered bearing estimate, $z(k)$ is the current bearing cluster measurement, and $\gamma_1(k)$ is the innovation sequence. As mentioned above (Eq. 35), this is equivalent to computing $$\hat{b}_1(k) = \hat{b}_1(k,k-1) + K_1(k)\gamma_1(k). \quad (53)$$

Filtered Variance

The filtered variance of this estimate is simply $$v_1(k) = [1 - K_1(k)H_1] v_1(k,k-1), \quad (54)$$

which may be expanded as $$v_1(k) = [1 - K_1(k)] v_1(k,k-1). \quad (55)$$

Track Coasting

There will be times when an emitter bearing estimate is not available. For example, this may be due to ESM system failures, improper dwell scheduling, and emitter fading due to low SNR. Since, in these cases, bearing estimates will not be available, the bearing track should be coasted to the time associated with the bearing update. The coasting duration time is a function of track confidence as well as track status.

If the bearing track is in coast mode, the corresponding elevation and ESM parameters must also be in coast mode. It is possible, and at times necessary, to update a bearing track while coasting the corresponding elevation track.

It should also be noted that for these reasons, the initiate and drop track criteria for bearing angle should be evaluated separately from the associated elevation track. That is, bearing tracks should be allowed to initiate and drop without reference to the elevation track. However, as mentioned earlier, if a bearing track does not continue to exist then the corresponding elevation and ESM parameter track will also cease to exist.

The simplest way to derive the filter for coasting is to recognize that coasting is equivalent to receiving a measurement with zero accuracy (or infinite measurement variance). Using this analogy implies the Kalman gain (see the appropriate equation above) goes to zero and the filtered estimate simply becomes the predicted estimate. The sequence for filtering during a bearing coast is the same for each of the three bearing filters. Coasting a track is achieved by setting the filter gain to zero (equivalent to setting the measurement variance to infinity).

With the Kalman gain set to zero, the remaining equations for filtered estimate and variance are the same as those defined above (Eqs. 51-53). In this case, the filtered estimate is given by the prediction $$\hat{x}_1(k) = \hat{x}_1(k,k-1) \quad (56)$$

or, equivalently, $$\hat{b}_1(k) = \hat{b}_1(k,k-1) \quad (57)$$

and the filtered variance takes the form $$v_1(k) = v_1(k,k-1) \quad (58)$$

The Two-State Bearing Filter

The bearing filter 104 is a second-order Kalman filter. The filter 104's general equation corresponds to an alpha-beta filter and is given by $$\hat{x}_2(k) = \Phi_2(k,k-1)\hat{x}_2(k-1) + K_2(k)[z(k) - H_2(k)\Phi_2(k,k-1)\hat{x}_2(k-1)], \quad (59)$$

where for the bearing filter 104 we define $$\hat{x}_2(k) = \begin{bmatrix} \hat{b}_2(k) \\ \hat{\dot{b}}_2(k) \end{bmatrix}, \quad (60)$$

$$\Phi_2(k, k-1) = \begin{bmatrix} 1 & \Delta t \\ 0 & 1 \end{bmatrix}, \quad (61)$$

$$z(k) = b_m(k), \text{ and} \quad (62)$$

$$H_2(k) = [1 \ 0]. \quad (63)$$

In the above, $\hat{x}_2(k-1)$ is the 2×1 vector of filtered bearing estimates valid at time k−1 from the previous iteration and valid before the current bearing data is received. $\Delta t$ is the difference between the current cluster measurement time and the last time the track was updated (time of previous cluster update). $z(k) = b_m(k)$ is the bearing angle measurement from the current emitter report. $\Phi_2(k,k-1)$ is a 2×2 state or plant transition model and describes the emitter motion from time segment k−1 to k. $H_2(k)$ is a 1×2 measurement transformation vector, and due to the form of $H_2$, $K_2(k)$ is a 2×1 vector of Kalman gain coefficients that weight the measurement residuals.

The above general equation for the filter update may also be simplified by introducing the predicted estimates and the predicted measurement terms. In terms of the predicted estimates, the general form of the filter equation may be written as $$\hat{x}_2(k) = \hat{x}_2(k, k-1) + K_2(k)[z(k) - H_2(k)\hat{x}_2(k, k-1)], \text{ where} \quad (64)$$

$$\hat{x}_2(k, k-1) = \Phi_2(k, k-1)\hat{x}_2(k-1) = \begin{bmatrix} \hat{b}_2(k, k-1) \\ \hat{\dot{b}}_2(k, k-1) \end{bmatrix} = \quad (65)$$

$$\begin{bmatrix} \hat{b}_2(k-1) + \Delta t \cdot \hat{\dot{b}}_2(k-1) \\ \hat{\dot{b}}_2(k-1) \end{bmatrix},$$

where $\hat{b}_2(k, k-1)$ is defined as the predicted bearing estimate and $\hat{\dot{b}}_2(k,k-1)$ is defined as the predicted bearing rate estimate. Defining the predicted measurement as $$\hat{z}_2(k,k-1) = H_2(k)\hat{x}_2(k,k-1) = \hat{b}_2(k,k-1) \quad (66)$$

allows the final form of the general Kalman filter equation to be written in compact form as $$\hat{x}_2(k)=\hat{x}_2(k,k-1)+K_2(k)\{z(k)-\hat{z}_2(k,k-1)\}. \tag{67}$$

Due to the form of $H_2$ above, the form of the Kalman gain is recognized as 2×1. Taking this into account and expanding the above yields two simple filter equations for the bearing and bearing rate filters 102 and 104:

$$\begin{cases} \hat{b}_2(k) = \hat{b}_2(k, k-1) + K_2^{(1)}(k)\{z(k) - \hat{z}_2(k, k-1)\} \\ \hat{\dot{b}}_2(k) = \hat{\dot{b}}_2(k, k-1) + K_2^{(2)}(k)\{z(k) - \hat{z}_2(k, k-1)\} \end{cases} \tag{68}$$

The sequence $\gamma_2(k)=z(k)-\hat{z}_2(k,k-1)$ is known as the innovation sequence and represents the new information to the filter 104. This term is also passed up to the IMM bearing filter 102 for model probability updates.

Finally, expanding the predicted estimate defined as $\Phi_2(k, k-1)\hat{x}_2(k-1)$ yields the expansion for the filter predictions as $$\begin{bmatrix} \hat{b}_2(k, k-1) \\ \hat{\dot{b}}_2(k, k-1) \end{bmatrix} = \begin{bmatrix} \hat{b}_2(k-1) + \Delta t \cdot \hat{\dot{b}}_2(k-1) \\ \hat{\dot{b}}_2(k-1) \end{bmatrix}. \tag{69}$$

Initialization

The two-state bearing angle Kalman filter 104 may be initialized using any one of three equivalent methods.

Method 1

In this method, the bearing filter 104 covariance matrix is initialized with large values on the diagonal:

$$\hat{x}_2(0) = \begin{bmatrix} 0 \\ 0 \end{bmatrix} \text{ and } v_2(0) = 10^{12} I_2, \text{ where} \tag{70}$$

$$I_2 = \begin{bmatrix} 1 & 0 \\ 0 & 1 \end{bmatrix}.$$

$v_2(0)$ is the initial 2×2 filtered covariance value and $I_2$ is a 2×2 identity matrix. A large value simply indicates no a priori information and, therefore, large uncertainty.

Method 2

In this method, the bearing filter 104 is initialized from the first cluster measurement of bearing angle. In this case we define $$\hat{x}_2(1) = \begin{bmatrix} b_m(1) \\ 0 \end{bmatrix} \text{ and } v_2(1) = \begin{bmatrix} v_{mc}(1) & 0 \\ 0 & 10^{12} \end{bmatrix} \tag{71}$$

where $b_m(1)$ is the bearing measurement provided with the first cluster and $v_{mc}(1)$ is the computed measurement variance associated with the same bearing measurement. The filter iteration starts at time k=2 with the second measurement.

Method 3

In this method, the bearing filter 104 is initialized from the first two cluster measurements of bearing angle. In this case, we define $$\hat{x}_2(2) = \begin{bmatrix} b_m(2) \\ \frac{b_m(2) - b_m(1)}{\Delta t} \end{bmatrix} \text{ and} \tag{72}$$

$$v_2(2) = \begin{bmatrix} v_{mc}(2) & \frac{v_{mc}(2)}{\Delta t} \\ \frac{v_{mc}(2)}{\Delta t} & \frac{2v_{mc}(2)}{(\Delta t)^2} \end{bmatrix}. \tag{73}$$

The filter iteration starts at time k=3 with the third measurement.

Predicted Estimate

When a new emitter report is associated with the bearing track, the first step in the filter update process requires that the track file estimate be predicted to the time of the current associated emitter report (time alignment). For the bearing filter 104, the predicted estimate is obtained from the transition matrix defined above, the filtered estimate $\hat{x}_2(k-1)$ from the previous track file update, and the time difference between the associated emitter report and the track file time (time of the last track update) as $$\hat{x}_2(k,k-1)=\Phi_2(k,k-1)\hat{x}_2(k-1) \tag{74}$$

or, equivalently, $$\begin{bmatrix} \hat{b}_2(k, k-1) \\ \hat{\dot{b}}_2(k, k-1) \end{bmatrix} = \begin{bmatrix} \hat{b}_2(k-1) + \Delta t \cdot \hat{\dot{b}}_2(k-1) \\ \hat{\dot{b}}_2(k-1) \end{bmatrix}, \tag{75}$$

where the 2×1 vector $\hat{x}_2(k,k-1)$ is the prediction of $\hat{x}_2(k-1)$ to the current emitter report time and $\hat{x}_2(k-1)$ is the previous filtered estimate obtained from the track file.

Predicted Variance and Plant Noise Estimates

Once the prediction is computed, computation of the the Kalman filter gain is required to merge the bearing emitter report data with the bearing angle of a track. The Kalman gain computation requires an estimate of the predicted variance and the measurement variance. The 2×2 predicted variance is given by $$v_2(k,k-1)=v_2(k-1)+\tilde{v}_2(k), \tag{76}$$

where $\tilde{v}_2(k)$ is the 2×2 plant noise estimate and $v_2(k-1)$ is obtained from the track file. For the bearing filter 104, the plant noise is set to $$\tilde{v}_2(k) = b_2^{(a)}(k) \cdot w_2^{(a)} \cdot b_2^{(a)}(k)' \text{ where} \tag{77}$$

$$b_2^{(a)}(k) = \begin{bmatrix} \Delta t \\ 1 \end{bmatrix}. \tag{78}$$

$w_2^{(a)}$ is a constant and preferably should be approximately set to $$w_2^{(a)}=0.1\pi/180/40 \approx 0.00005. \tag{79}$$

Therefore, $$\tilde{v}_2(k) = 0.00005 \cdot \begin{bmatrix} \Delta t^2 & \Delta t \\ \Delta t & 1 \end{bmatrix}. \tag{80}$$

As a final note, $w_2^{(a)}$ is a tuning parameter that controls filter bandwidth and should be optimized during testing.

Filter Gain and Measurement Noise Estimate

The 2×1 Kalman gain $K_2$ is given by $$K_2(k) = \frac{v_2(k, k-1)H_2'}{H_2 v_2(k, k-1)H_2' + v_{mc}(k)}. \tag{81}$$

We note here that a simple divide is used and that no matrix inverse operation is required since the term $H_2 v_2(k,k-1)H'_2$ is a scalar. However, to compute this gain, an estimate of emitter report bearing measurement noise is required. If the emitter report bearing measurement noise is not included in the cluster message it can be computed from the single pulse specification variance according to the following equation:

$$v_{mc}(k) = \frac{v_m(k)}{n}, \tag{82}$$

where the variable $v_{mc}(k)$ is the measurement noise variance in bearing associated with the cluster estimate. The variable $v_m(k)$ is the single pulse measurement accuracy (equivalent to the PDW accuracy) of the bearing angle, and n is the number of pulses reported in the emitter report message. The computation of $v_m(k)$ is as discussed above.

The Kalman gain may also be written in terms of the covariance of the innovation sequence as $$K_2(k) = \frac{v_2(k, k-1)H_2'}{S_2(k)}, \tag{83}$$

where $S_2(k)$ is the scalar covariance of the innovation sequence defined above and is given by the equation $$S_2(k) = H_2 v_2(k,k-1)H'_2 + v_{mc}(k). \tag{84}$$

The Filtered Estimate

After the Kalman gains are computed, the new filtered or track estimate is given by $$\hat{x}_2(k) = \hat{x}_2(k,k-1) + K_2(k)\{z(k) - \hat{z}_2(k,k-1)\}, \tag{85}$$

where $x_2(k)$ is the filtered bearing estimate and $z(k)$ is the current bearing cluster measurement. As mentioned above, this is equivalent to computing $$\begin{cases} \hat{b}_2(k) = \hat{b}_2(k, k-1) + K_2^{(1)}(k)\{z(k) - \hat{z}_2(k, k-1)\} \\ \hat{\dot{b}}_2(k) = \hat{\dot{b}}_2(k, k-1) + K_2^{(2)}(k)\{z(k) - \hat{z}_2(k, k-1)\} \end{cases} \tag{86}$$

or, equivalently, $$\begin{cases} \hat{b}_2(k) = \hat{b}_2(k, k-1) + K_2^{(1)}(k)\gamma_2(k) \\ \hat{\dot{b}}_2(k) = \hat{\dot{b}}_2(k, k-1) + K_2^{(2)}(k)\gamma_2(k) \end{cases}, \tag{87}$$

where $\gamma_2(k)$ is the innovation sequence.

Filtered Variance

The filtered variance of this estimate is simply $$v_2(k) = [I_2 - K_2(k)H_2] \cdot v_2(k,k-1), \tag{88}$$

which may be expanded as $$v_2(k) = \begin{bmatrix} 1 - K_2^{(1)}(k) & 0 \\ -K_2^{(2)}(k) & 1 \end{bmatrix} \cdot v_2(k, k-1), \tag{89}$$

where $I_2$ is the 2×2 identity matrix, and $v_2(k,k-1)$ was defined above.

Track Coasting

As discussed above, the filter gain is set to $$K_2(k) = \begin{bmatrix} 0 \\ 0 \end{bmatrix}. \tag{90}$$

With the Kalman gain set to zero, the remaining equations for filtered estimate and variance are the same as those defined above. In this case, the filtered estimate is given by the prediction $$\hat{x}_2(k) = \hat{x}_2(k,k-1) \tag{91}$$

or, equivalently, $$\begin{cases} \hat{b}_2(k) = \hat{b}_2(k, k-1) \\ \hat{\dot{b}}_2(k) = \hat{\dot{b}}_2(k, k-1) \end{cases}, \tag{92}$$

and the filtered variance takes the form $$v_2(k) = v_2(k,k-1). \tag{93}$$

The Three-State Bearing Filter

The bearing filter 106 is a third-order Kalman filter. The filter's general equation corresponds to an alpha-beta-gamma and is given by $$\hat{x}_3(k) = \Phi_3(k,k-1)\hat{x}_3(k-1) + K_3(k)\{z(k) - H_3(k)\Phi_3(k,k-1)\hat{x}_3(k-1)\}, \tag{94}$$

where for the bearing filter 106 we define $$\hat{x}_3(k) = \begin{bmatrix} \hat{b}_3(k) \\ \hat{\dot{b}}_3(k) \\ \hat{\ddot{b}}_3(k) \end{bmatrix}, \tag{95}$$

$$\Phi_3(k, k-1) = \begin{bmatrix} 1 & \Delta t & \Delta t^2/2 \\ 0 & 1 & \Delta t \\ 0 & 0 & 1 \end{bmatrix}, \tag{96}$$

$$z(k) = b_m(k), \text{ and} \tag{97}$$

$$H_3(k) = [1 \; 0 \; 0]. \tag{98}$$

In the above, $\hat{x}_3(k-1)$ is the 3×1 vector of filtered bearing estimates valid at time k−1 from the previous iteration and valid before the current bearing data is received. $\Delta t$ is the difference between the current cluster measurement time and the last time the track was updated (time of previous cluster update). $z(k)=b_m(k)$ is the bearing angle measurement from the current cluster descriptor (emitter report). $\Phi_3(k,k-1)$ is a 3×3 state or plant transition model and describes the emitter motion from time segment k−1 to k. $H_3(k)$ is a 1×3 measurement transformation vector and due to the form of $H_3$, $K_3(k)$ is a 3×1 vector of Kalman gain coefficients that weight the measurement residuals.

The above general equation for the filter update may also be simplified by introducing the predicted estimates and the predicted measurement terms. In terms of the predicted estimates, the general form of the filter equation may be written as $$\hat{x}_3(k) = \hat{x}_3(k,k-1) + K_3(k)\{z(k) - H_3(k)\hat{x}_3(k,k-1)\}, \tag{99}$$

where $$\hat{x}_3(k, k-1) = \Phi_3(k, k-1)\hat{x}_3(k-1) = \begin{bmatrix} \hat{b}_3(k, k-1) \\ \hat{\dot{b}}_3(k, k-1) \\ \hat{\ddot{b}}_3(k, k-1) \end{bmatrix} = \tag{100}$$

$$\begin{bmatrix} \hat{b}_3(k-1) + \Delta t \cdot \hat{\dot{b}}_3(k-1) + 0.5 \cdot \Delta t^2 \cdot \hat{\ddot{b}}_3(k-1) \\ \hat{\dot{b}}_3(k-1) + \Delta t \cdot \hat{\ddot{b}}_3(k-1) \\ \hat{\ddot{b}}_3(k-1) \end{bmatrix}$$

where $\hat{b}_3(k,k-1)$ is defined as the predicted bearing estimate, $\hat{\dot{b}}_3(k,k-1)$ is defined as the predicted bearing rate estimate, and $\hat{\ddot{b}}_3(k,k-1)$ is defined as the predicted bearing acceleration estimate.

Defining the predicted measurement as $$\hat{z}_3(k,k-1) = H_3(k)\hat{x}_3(k,k-1) = \hat{b}_3(k,k-1) \tag{101}$$

allows the final form of the general Kalman filter equation to be written in compact form as $$\hat{x}_3(k) = \hat{x}_3(k,k-1) + K_3(k)\{z(k) - \hat{z}_3(k,k-1)\}. \tag{102}$$

Due to the form of the $H_3$ matrix, the Kalman gain is recognized as a 3×1 matrix. Taking this into account and expanding the above yields three simple filter equations for the bearing, bearing rate and bearing acceleration filters 102, 104, and 106:

$$\begin{cases} \hat{b}_3(k) = \hat{b}_3(k, k-1) + K_3^{(1)}(k)\{z(k) - \hat{z}_3(k, k-1)\} \\ \hat{\dot{b}}_3(k) = \hat{\dot{b}}_3(k, k-1) + K_3^{(2)}(k)\{z(k) - \hat{z}_3(k, k-1)\} \\ \hat{\ddot{b}}_3(k) = \hat{\ddot{b}}_3(k, k-1) + K_3^{(3)}(k)\{z(k) - \hat{z}_3(k, k-1)\} \end{cases} \tag{103}$$

The sequence $\gamma_3(k)=z(k)-\hat{z}_3(k,k-1)$ is known as the innovation sequence and represents the new information to the filter 106. This term is also passed up to the IMM bearing filter 102 for model probability updates.

Finally, expanding the predicted estimate defined as $\Phi(k,k-1)$ yields the expansion for the filter predictions as $$\begin{bmatrix} \hat{b}_3(k, k-1) \\ \hat{\dot{b}}_3(k, k-1) \\ \hat{\ddot{b}}_3(k, k-1) \end{bmatrix} = \begin{bmatrix} \hat{b}_3(k-1) + \Delta t \cdot \hat{\dot{b}}_3(k-1) + 0.5 \cdot \Delta t^2 \cdot \hat{\ddot{b}}_3(k-1) \\ \hat{\dot{b}}_3(k-1) + \Delta t \cdot \hat{\ddot{b}}_3(k-1) \\ \hat{\ddot{b}}_3(k-1) \end{bmatrix}. \tag{104}$$

Initialization

The three-state bearing angle Kalman filter 106 may be initialized using one of three methods.

Method 1

In this method, the bearing filter covariance matrix is initialized with large values on the diagonal:

$$\hat{x}_3(0) = \begin{bmatrix} 0 \\ 0 \\ 0 \end{bmatrix} \text{ and } v_3(0) = 10^{12} \cdot I_3, \text{ where} \tag{105}$$

$$I_3 = \begin{bmatrix} 1 & 0 & 0 \\ 0 & 1 & 0 \\ 0 & 0 & 1 \end{bmatrix}.$$

$v_3(0)$ is the initial 3×3 filtered covariance value and $I_3$ is a 3×3 identity matrix. A large value simply indicates no a priori information and, therefore, large uncertainty.

Method 2

In this method, the bearing filter is initialized from the first cluster measurement of bearing angle. In this case, we define $$\hat{x}_3(1) = \begin{bmatrix} b_m(1) \\ 0 \\ 0 \end{bmatrix} \text{ and } v_3(1) = \begin{bmatrix} v_{mc}(1) & 0 & 0 \\ 0 & 10^{12} & 0 \\ 0 & 0 & 10^{12} \end{bmatrix}, \tag{106}$$

where $b_m(1)$ is the bearing measurement provided with the first cluster and $v_{mc}(1)$ is the computed measurement variance associated with the same bearing measurement. The filter iteration starts at time k=2.

Method 3

In this method, the bearing filter is initialized from the first two cluster measurements of bearing angle. In this case, we define $$\hat{x}_3(2) = \begin{bmatrix} b_m(2) \\ \dfrac{b_m(2) - b_m(1)}{\Delta t} \\ 0 \end{bmatrix} \text{ and} \qquad (107)$$

$$v_3(2) = \begin{bmatrix} v_{mc}(2) & \dfrac{v_{mc}(2)}{\Delta t} & 0 \\ \dfrac{v_{mc}(2)}{\Delta t} & \dfrac{2 v_{mc}(2)}{(\Delta t)^2} & 0 \\ 0 & 0 & 10^{12} \end{bmatrix}. \qquad (108)$$

The filter iteration starts at time k=3 with the third measurement.

Predicted Estimate

When a new emitter report is associated with the bearing track, the first step in the filter update process requires that the track file estimate be predicted to the time of the current associated emitter report (time alignment). For the bearing filter 106, the predicted estimate is obtained from the transition matrix defined above, the filtered estimate $\hat{x}_3(k-1)$ from the last track file update, and the time difference between the associated emitter report and the track file time (time of the last track update) as $$\hat{x}_3(k,k-1) = \Phi_3(k,k-1)\hat{x}_3(k-1) \qquad (109)$$

or, equivalently, $$\begin{bmatrix} \hat{b}_3(k,k-1) \\ \hat{\dot{b}}_3(k,k-1) \\ \hat{\ddot{b}}_3(k,k-1) \end{bmatrix} = \begin{bmatrix} \hat{b}_3(k-1) + \Delta t \cdot \hat{\dot{b}}_3(k-1) + 0.5 \cdot \Delta t^2 \cdot \hat{\ddot{b}}_3(k-1) \\ \hat{\dot{b}}_3(k-1) + \Delta t \cdot \hat{\ddot{b}}_3(k-1) \\ \hat{\ddot{b}}_3(k-1) \end{bmatrix}, \qquad (110)$$

where the 3×1 vector $\hat{x}_3(k,k-1)$ is the prediction of $\hat{x}_3(k-1)$ to the current emitter report time and $\hat{x}_3(k-1)$ is the previous filtered estimate obtained from the track file.

Predicted Variance and Plant Noise Estimates

Once the prediction is computed, computation of the the Kalman filter gain is required to merge the bearing emitter report data with the bearing angle of a track. The Kalman gain computation requires an estimate of the predicted variance and the measurement variance. The 3×3 predicted variance is given by $$v_3(k,k-1) = v_3(k-1) + \tilde{v}_3(k), \qquad (111)$$

where $\tilde{v}_3(k)$ is the 3×3 plant noise estimate and $v_3(k-1)$ is obtained from the track file. For the bearing filter 106, the plant noise is set to $$\tilde{v}_3(k) = b_3^{(a)}(k) \cdot w_3^{(a)} \cdot b_3^{(a)}(k)', \qquad (112)$$

where $$b_3^{(a)}(k) = \begin{bmatrix} \Delta t^2/2 \\ \Delta t \\ 1 \end{bmatrix}. \qquad (113)$$

$w_3^{(a)}$ is a constant and should be approximately set to $$w_3^{(a)} = 0.1\pi/180/40 \cong 0.00005. \qquad (114)$$

Therefore, $$\tilde{v}_3(k) = 0.00005 \cdot \begin{bmatrix} \Delta t^4/4 & \Delta t^3/2 & \Delta t^2/2 \\ \Delta t^3/2 & \Delta t^2 & \Delta t \\ \Delta t^2/2 & \Delta t & 1 \end{bmatrix}. \qquad (115)$$

As a final note, $w_3^{(a)}$ is a tuning parameter that controls filter bandwidth and should be optimized during testing.

Filter Gain and Measurement Noise Estimate

The 3×1 Kalman gain $K_3$ is given by $$K_3(k) = \dfrac{v_3(k,k-1)H_3'}{H_3 v_3(k,k-1)H_3' + v_{mc}(k)}. \qquad (116)$$

Note here that a simple divide is used and that no matrix inverse operation is required since the term $H_3 v_3(k,k-1)H_3'$ is a scalar. However, to compute this gain, an estimate of emitter report bearing measurement noise is required. If the emitter report bearing measurement noise is not included in the cluster message it can be computed from the single pulse specification variance according to the equation $$v_{mc}(k) = \dfrac{v_m(k)}{n}, \qquad (117)$$

where the variable $v_{mc}(k)$ is the measurement noise variance in bearing associated with the cluster estimate. The variable $v_m(k)$ is the single pulse measurement accuracy (equivalent to the PDW accuracy) of the bearing angle, and n is the number of pulses reported in the cluster descriptor message. The computation of $v_m(k)$ is discussed further herein.

The 3×1 Kalman gain may also be written in terms of the covariance of the innovation sequence as $$K_3(k) = \dfrac{v_3(k,k-1)H_3'}{S_3(k)}, \qquad (118)$$

where $S_3(k)$ is the scalar covariance of the innovation sequence defined above and is given by the equation $$S_3(k) = H_3 v_3(k,k-1)H_3' + v_{mc}(k). \qquad (119)$$

The Filtered Estimate

After the Kalman gains are computed, the new filtered or track estimate is given by $$\hat{x}_3(k) = \hat{x}_3(k,k-1) + K_3(k)\{z(k) - \hat{z}_3(k,k-1)\}, \qquad (120)$$

where $\hat{x}_3(k)$ is the filtered bearing estimate and z(k) is the current bearing cluster measurement. As mentioned above, this is equivalent to computing $$\begin{cases} \hat{b}_3(k) = \hat{b}_3(k, k-1) + K_3^{(1)}(k)\{z(k) - \hat{z}_3(k, k-1)\} \\ \hat{\dot{b}}_3(k) = \hat{\dot{b}}_3(k, k-1) + K_3^{(2)}(k)\{z(k) - \hat{z}_3(k, k-1)\} \\ \hat{\ddot{b}}_3(k) = \hat{\ddot{b}}_3(k, k-1) + K_3^{(3)}(k)\{z(k) - \hat{z}_3(k, k-1)\} \end{cases} \quad (121)$$

or, equivalently, $$\begin{cases} \hat{b}_3(k) = \hat{b}_3(k, k-1) + K_3^{(1)}(k)\gamma_3(k) \\ \hat{\dot{b}}_3(k) = \hat{\dot{b}}_3(k, k-1) + K_3^{(2)}(k)\gamma_3(k) \\ \hat{\ddot{b}}_3(k) = \hat{\ddot{b}}_3(k, k-1) + K_3^{(3)}(k)\gamma_3(k) \end{cases} \quad (122)$$

where $\gamma_3(k)$ is the innovation sequence.

Filtered Variance

The filtered variance of this estimate is simply $$v_3(k) = [I_3 - K_3(k)H_3]v_3(k, k-1), \quad (123)$$

which may be expanded as $$v_3(k) = \begin{bmatrix} 1 - K_3^{(1)}(k) & 0 & 0 \\ -K_3^{(2)}(k) & 1 & 0 \\ -K_3^{(3)}(k) & 0 & 1 \end{bmatrix} \cdot v_3(k, k-1), \quad (124)$$

where $I_3$ is the 3×3 identity matrix, and $v_3(k,k-1)$ was defined above.

Track Coasting

As discussed above, when a track is to be coasted, the filter gain is set to $$K_3(k) = \begin{bmatrix} 0 \\ 0 \\ 0 \end{bmatrix}. \quad (125)$$

With the Kalman gain set to zero, the remaining equations for filtered estimate and variance are the same as those defined above. In this case, the filtered estimate is given by the prediction $$\hat{x}_3(k) = \hat{x}_3(k, k-1) \quad (126)$$

or, equivalently, $$\begin{cases} \hat{b}_3(k) = \hat{b}_3(k, k-1) \\ \hat{\dot{b}}_3(k) = \hat{\dot{b}}_3(k, k-1) \\ \hat{\ddot{b}}_3(k) = \hat{\ddot{b}}_3(k, k-1) \end{cases} \quad (127)$$

and the filtered variance takes the form $$v_3(k) = v_3(k, k-1). \quad (128)$$

The Elevation Filter

The elevation filter is a second-order Kalman filter that models both elevation and elevation rate. This same filter structure is used for the second-order bearing filter 104. The filter assumes that the measurement error variance is properly defined for elevation angle as a function of measured frequency and SNR.

The filter equation corresponds to an alpha-beta filter and is given by $$\hat{x}(k) = \Phi(k, k-1)\hat{x}(k-1) + K(k)[z(k) - H(k)\Phi(k, k-1)\hat{x}(k-1)], \quad (129)$$

where for the elevation filter, we define $$\hat{x}(k) = \begin{bmatrix} \hat{e}(k) \\ \hat{\dot{e}}(k) \end{bmatrix}, \quad (130)$$

$$\Phi(k, k-1) = \begin{bmatrix} 1 & \Delta t \\ 0 & 1 \end{bmatrix}, \quad (131)$$

$$z(k) = e_m(k), \text{ and} \quad (132)$$

$$H(k) = [1 \ 0]. \quad (133)$$

In the above, $\hat{x}(k)$ is a 2×1 vector of filtered estimates valid at time k−1 from the previous iteration and valid before the current elevation data is received. Δt is the difference between the current cluster measurement time and the last time the track was updated (time of previous cluster update). $z(k) = e_m(k)$ is the elevation angle measurement from the current emitter report. $\Phi(k,k-1)$ is a 2×2 state or plant transition model and describes the emitter motion from time segment k−1 to k. K(k) is a 2×1 vector of Kalman gain coefficients and H(k) is a 1×2 measurement vector.

The above equation for the filter update may also be written as $$\hat{x}(k) = \hat{x}(k, k-1) + K(k)[z(k) - H(k)\hat{x}(k, k-1)], \quad (134)$$

where the above is written in terms of the predicted estimate $$\hat{x}(k, k-1) = \hat{e}(k, k-1). \quad (135)$$

Expanding the above yields the two equations for elevation and elevation rate as $$\begin{cases} \hat{e}(k) = \hat{e}(k, k-1) + K^{(1)}(k)[z(k) - \hat{z}(k, k-1)] \\ \hat{\dot{e}}(k) = \hat{\dot{e}}(k, k-1) + K^{(2)}(k)[z(k) - \hat{z}(k, k-1)] \end{cases}, \quad (136)$$

where $K^{(1)}(k)$ is equivalent to the gain, $\alpha$, used by an alpha-beta filter and $K^{(2)}(k)$ is equivalent to $\beta/\Delta t$.

In addition. the predicted estimates presented above are defined as follows:

$$\hat{e}(k, k-1) = \hat{e}(k-1) + \Delta t \cdot \hat{\dot{e}}(k-1) \quad (137)$$

is the predicted elevation angle, $$\hat{\dot{e}}(k, k-1) = \hat{\dot{e}}(k-1) \quad (138)$$

is the predicted elevation angle rate, and $$\hat{z}(k, k-1) = H(k)\Phi(k, k-1)\hat{x}(k-1) = \hat{e}(k, k-1) \quad (139)$$

is the predicted elevation cluster measurement.

The sequence $z(k)-\hat{z}(k,k-1)$ is known as the innovation sequence and represents the new information to the filter.

Initialization

The elevation filter may be initialized using one of three equivalent methods.

Method 1

In this method, the bearing filter covariance matrix is initialized with large values on the diagonal:

$$\hat{x}(0) = \begin{bmatrix} 0 \\ 0 \end{bmatrix} \text{ and } v_e(0) = 10^{12} \cdot I_2, \text{ where} \quad (140)$$

$$I_2 = \begin{bmatrix} 1 & 0 \\ 0 & 1 \end{bmatrix}.$$

$v_e(0)$ is the initial 2×2 filtered covariance value and $I_2$ is a 2×2 identity matrix. A large value simply indicates no a priori information.

Method 2

In this method, the elevation filter is initialized from the first cluster measurement of elevation angle. In this case, we define $$\hat{x}(1) = \begin{bmatrix} e_m(1) \\ 0 \end{bmatrix} \text{ and } v_e(1) = \begin{bmatrix} v_{ce}(1) & 0 \\ 0 & 10^{12} \end{bmatrix}, \quad (141)$$

where $e_m(1)$ is the elevation measurement provided with the first cluster and $v_{ce}(1)$ is the measurement accuracy associated with the elevation measurement. The filter iteration starts at time k=2 with the second measurement.

Method 3

In this method, the elevation filter is initialized from the first two cluster measurements of elevation angle. In this case, we define $$\hat{x}(2) = \begin{bmatrix} e_m(2) \\ \frac{e_m(2) - e_m(1)}{\Delta t} \end{bmatrix} \text{ and } v_e(2) = \begin{bmatrix} v_{ce}(2) & \frac{v_{ce}(2)}{\Delta t} \\ \frac{v_{ce}(2)}{\Delta t} & \frac{2v_{ce}(2)}{(\Delta t)^2} \end{bmatrix}. \quad (142)$$

The filter iteration starts at time k=3. This is the preferred method since it starts the filter when a emitter report elevation measurement has correlated with a first point. Therefore, the initial elevation emitter report is not the first track entry.

Predicted Estimate

When a new emitter report is associated with the elevation track, the first step in the filter update process requires that the track file estimate be predicted to the time of the current associated emitter report (time alignment). For the elevation filter, the predicted estimate is obtained from the transition matrix defined above, the filtered estimate $\hat{x}(k)$, and the time difference between the associated emitter report and the track file time (time of the last track update) as $$\hat{x}(k, k-1) = \Phi(k, k-1)\hat{x}(k-1) = \begin{bmatrix} \hat{e}(k, k-1) \\ \hat{\dot{e}}(k, k-1) \end{bmatrix} = \begin{bmatrix} \hat{e}(k-1) + \Delta t \cdot \hat{\dot{e}}(k-1) \\ \hat{\dot{e}}(k-1) \end{bmatrix}, \quad (143)$$

where $\hat{x}(k,k-1)$ is the prediction of $\hat{x}(k-1)$ to the current emitter report time and $\hat{x}(k-1)$ is the filtered estimate obtained from the track file.

Predicted Variance and Plant Noise Estimates

Once the prediction is computed, computation of the Kalman filter gain is required to merge the elevation emitter report data with the elevation track. The Kalman gain computation requires an estimate of the predicted variance and the measurement variance. The predicted variance is given by $$v_e(k,k-1) = v_e(k-1) + \tilde{v}_e(k), \quad (144)$$

where $\tilde{v}_e(k)$ is the plant noise estimate. For the elevation filter, the plant noise is set to $$\tilde{v}_e(k) = b_e(k) \cdot w_e \cdot b_e(k)' \text{ where} \quad (145)$$

$$b_e(k) = \begin{bmatrix} \frac{\Delta t^2}{2} \\ \Delta t \end{bmatrix} \text{ and } w_e = \sigma_e^2. \quad (146)$$

$\sigma_e^2$ is a constant and should be approximately set to $$\sigma_e^2 = 0.1 \cdot \pi/180/40 \approx 0.00005. \quad (147)$$

Therefore, $$\tilde{v}_e(k) = 0.00005 \cdot \begin{bmatrix} \left(\frac{\Delta t^2}{2}\right) & \frac{\Delta t^3}{2} \\ \frac{\Delta t^3}{2} & \Delta t^2 \end{bmatrix}. \quad (148)$$

Filter Gain and Measurement Noise Estimate

The Kalman gain is given by $$K(k) = \frac{v_e(k, k-1)H'}{Hv_e(k, k-1)H' + v_{ce}(k)}. \quad (149)$$

We note here that a simple divide is used and that no matrix inverse operation is required since the term $Hv_e(k,k-1)H'$ is a scalar. However, to compute this gain, an estimate of emitter report elevation measurement noise is required. If the emitter report elevation measurement noise is not included in the cluster message, it can be computed from the single pulse specification variance according to the equation $$v_{ce}(k) = \frac{v_{me}(k)}{n}, \quad (150)$$

where $v_{ce}(k)$ is the measurement noise variance in elevation associated with the cluster estimate, $v_{me}(k)$ is the single pulse measurement accuracy (equivalent to the PDW accuracy) of the elevation angle, and n is the number of pulses reported in the cluster descriptor message. The computation of $v_{me}(k)$ was discussed previously.

The Kalman gain may also be written in terms of the innovation sequence as $$K(k) = \frac{v_e(k, k-1) \cdot H'}{S(k)}, \quad (151)$$

where $S(k)$ is the scalar covariance of the innovation sequence defined above and is given by the scalar $$S(k) = H \cdot v_e(k, k-1) \cdot H' + v_{ce}(k). \quad (152)$$

The Filtered Estimate

After the Kalman gains are computed, the new filtered or track estimate is given by $$\hat{x}(k) = \hat{x}(k, k-1) + K(k)[z(k) - \hat{z}(k, k-1)], \quad (153)$$

where $\hat{x}(k)$ is the filtered elevation estimate and $z(k)$ is the current elevation cluster measurement. As mentioned above, this is equivalent to computing $$\begin{cases} \hat{e}(k) = \hat{e}(k, k-1) + K^{(1)}(k)[z(k) - \hat{z}(k, k-1)] \\ \hat{\dot{e}}(k) = \hat{\dot{e}}(k, k-1) + K^{(2)}(k)[z(k) - \hat{z}(k, k-1)] \end{cases}. \quad (154)$$

Filtered Variance

The filtered variance of this estimate is simply $$v_e(k) = [I_2 - K(k)H] v_e(k, k-1), \quad (155)$$

where $I_2$ is the 2×2 identity matrix, and $v_e(k, k-1)$ was defined above.

Track Coasting

To coast a track, the filter gain is set to $$K(k) = \begin{bmatrix} 0 \\ 0 \end{bmatrix}. \quad (156)$$

With the Kalman gain set to zero, the remaining equations for filtered estimate and variance are the same as those defined above. In this case, the filtered estimate is given by the prediction $$\hat{x}(k) = \hat{x}(k, k-1) \quad (157)$$

and the filtered variance takes the form $$v_e(k) = v_e(k, k-1). \quad (158)$$

4. The ESM Parameters Filter

The ESM parameters filter is a simple first-order Kalman filter that may be used to update both agile and non-agile parameters as well as automatically generate gates for ESM front-end sorting. The filter equation for all ESM parameters is identical to an alpha-only filter and is given by $$x(k) = x(k-1) + \alpha[z(k) - x(k-1)], \quad (159)$$

where x is the parameter to be stored in the track file and may be represented by frequency, pulsewidth, pulse repetition interval (PRI), or amplitude, and z is the current measured and averaged parameters from the cluster descriptor.

Initialization

Each ESM parameters filter may be initialized using one of two equivalent methods.

Method 1

The filter is initialized with
  $x(0) = 0$ and $v_f(0) = 10^{12}$
  $k = 0$
  Gate = ESM parameter default size where $v_f(k)$ is the associated filtered covariance value. A large value simply indicates no a priori information. In this case, $v_f(k)$ is a scalar since the filters are one-dimensional. Gate is the default ESM gate size associated with the front-end default gates for the parameter of interest. The default gate results in initial clusters, which represent first points to the track file.

Method 2

In this method, the ESM parameters filter is initialized from the first cluster measurement. In this case, we define $$x(1) = z_m(1) \text{ and } v_f(1) = v_{cz}(1) \quad (160)$$

where $z_m(1)$ is the ESM parameter measurement of interest (frequency, PRI, pulsewidth, or amplitude) and $v_{cz}(1)$ is its associated scaler covariance. $v_{cz}(k)$ is the measurement accuracy associated with the ESM parameter measurement provided in the cluster descriptor. The filter iteration starts at time $k = 2$.

Predicted Estimate

For the ESM parameters filter, the predicted estimate is simply the filtered estimate since no higher-order derivatives are used for ESM parameter tracking:

$$x(k, k-1) = x(k-1), \quad (161)$$

where $x(k, k-1)$ is the one step prediction of $x(k-1)$.

Predicted Variance, Measurement Noise and Plant Noise Estimates

The predicted variance is given by $$v_p(k, k-1) = v_f(k-1) + \tilde{v}_p(k) \quad (162)$$

where $\tilde{v}_p(k)$ is the plant noise estimate. For the case with jitter, the cluster plant noise may be estimated as $$v_{pc}(k) = \frac{(x_{max} - x_{min})^2}{12}, \quad (163)$$

where $v_{pc}(k)$ refers to the measured plant noise or spread (max minus min) obtained from the parameter measurements provided in the cluster descriptor, and $(x_{max}, x_{min})$ are the largest and the smallest parameter measurement in the cluster descriptor, respectively. The average plant noise may be obtained by using an appropriate alpha filter with gain limited to 0.1, or $$\tilde{v}_p(k) = \tilde{v}_p(k-1) + 0.1 \cdot \left[ \frac{(x_{max} - x_{min})^2}{12} - \tilde{v}_p(k-1) \right], \quad (164)$$

where this filter is initialized with the first measurement of spread provided in the cluster descriptor.

This will accurately estimate the plant noise if the measurement noise is negligible by comparison (always the case for a jittered measurement). If the estimate of parameter spread is small, then no agility is present and the plant noise should be set to one-tenth of the measurement noise for heavier smoothing. This is checked for by implementing the test described below.

For $v_{pc}(k) \leq 4v_{cz}(k)$ or $Freq$ Type = 'Fixed', set $$\tilde{v}_p(k) = \frac{v_{cz}(k)}{10}.$$

Filter Gain

The filter gain, alpha, is a function of the predicted variance. This gain is computed after the cluster is received and begins the filter iteration for the current update. The Kalman gain is given by $k \Rightarrow k+1$ $$\alpha(k) = \frac{v_p(k, k-1)}{v_p(k, k-1) + v_{cz}(k)}. \quad (165)$$

However, to compute this gain, an estimate of parameter measurement noise is required. This is computed as $$v_{cz}(k) = \frac{v_{mz}(k)}{n}, \quad (166)$$

where $v_{cz}(k)$ is the measurement noise variance associated with the cluster estimate, $v_{mz}(k)$ is the single pulse (PWD) measurement accuracy of the parameter of interest, and n is the number of pulses reported in the cluster descriptor message.

If unknown, the cluster measurement variance may be approximated by $$v_{cz}(1) = \frac{(1.5 * res)^2}{n}, \quad (167)$$

where res is the resolution of the parameter of interest.

Filtered Estimate

The filtered estimate is given by $$x(k) = x(k-1) + \alpha(k)[z(k) - x(k-1)], \quad (168)$$

where x(k) is the filtered ESM parameters estimate and z(k) is the current ESM cluster measurement. Due to the initialization, for the first ESM parameter update this should yield $$\alpha \approx 1 \text{ and } x(1) \approx z(1). \quad (169)$$

Filtered Variance

The filtered variance of this estimate is simply given by $$v_f(k) = [1 - \alpha(k)]v_p(k, k-1). \quad (170)$$

For the first cluster update, this will be approximately equal to the initial cluster measurement variance $$v_f(1) \approx v_{cz}(1). \quad (171)$$

Figure 7:
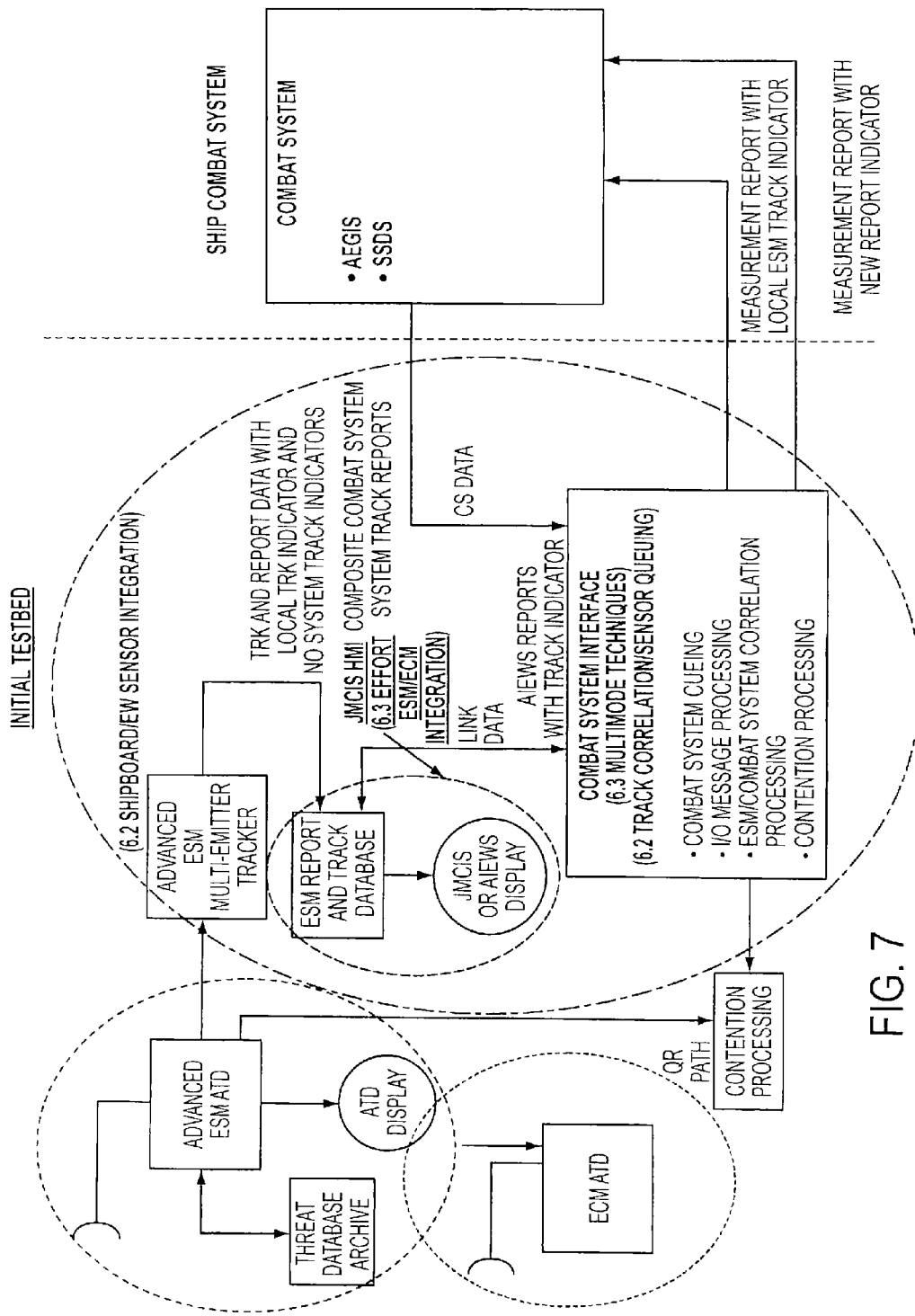
FIG. 7 is an ESM tracker interfaced with a combat system interface and a combat radar system according to the invention.
Figure 8:
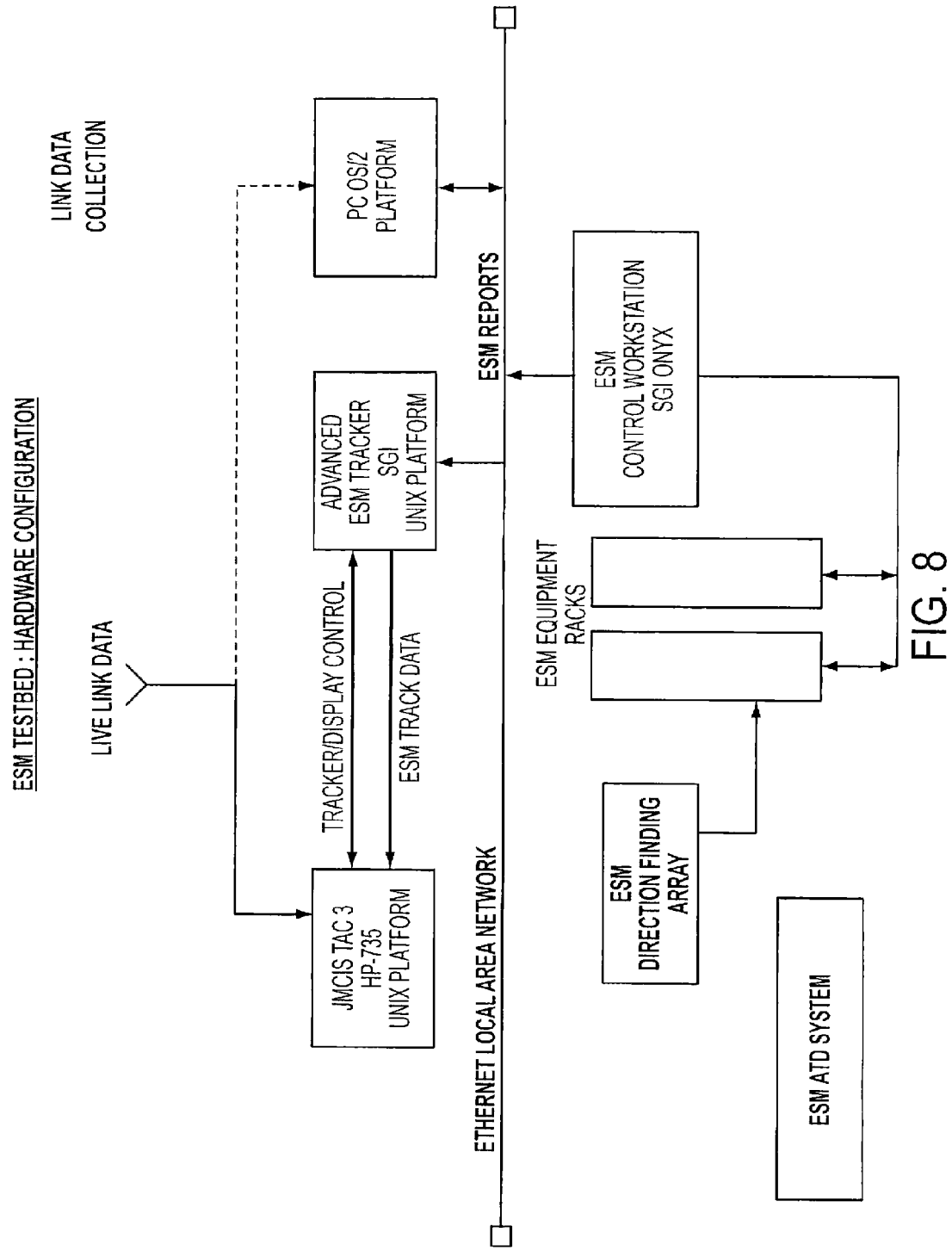
FIG. 8 is an ESM tracker illustrating representative data stream interfaces according to the invention.
Figure 9:
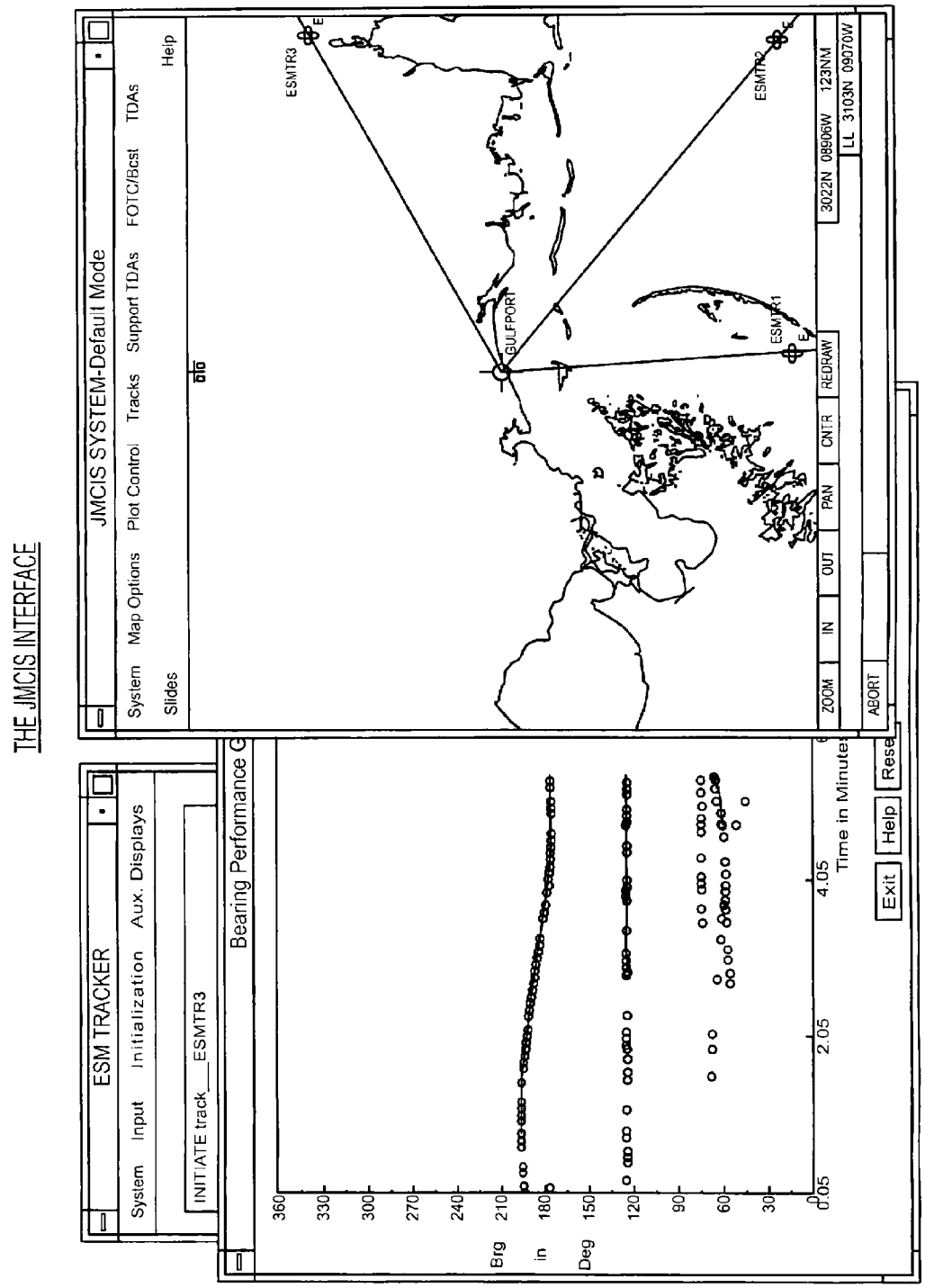
FIGS. 9-11 show the real-time results of the system of FIGS. 7 and 8.
Figure 10:
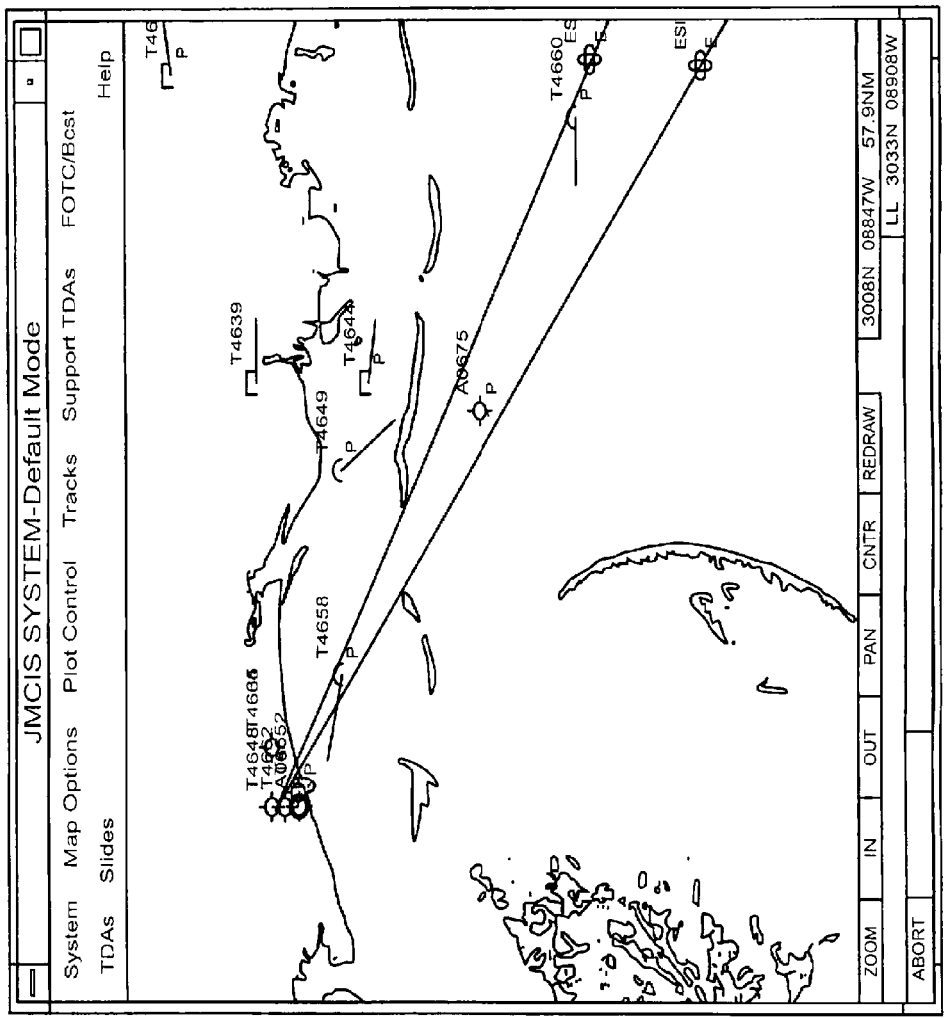
Figure 11:
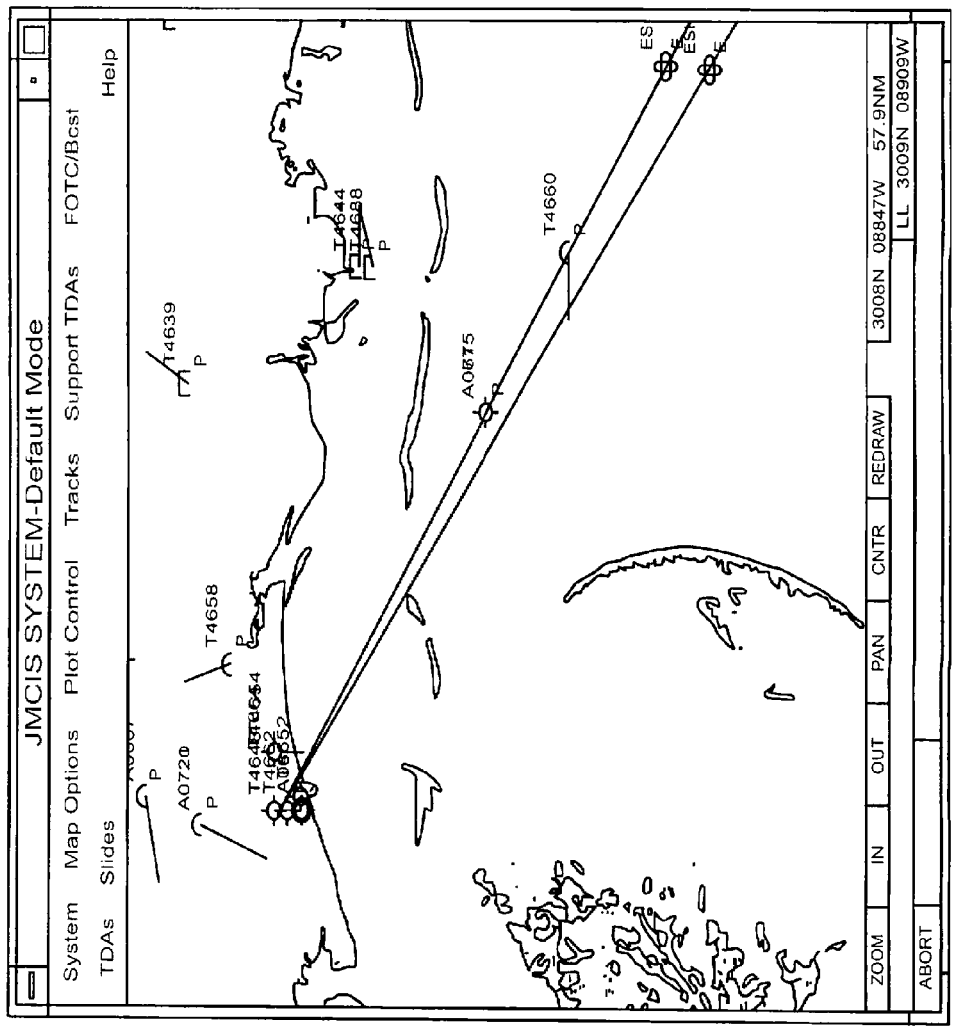
Figure 12:
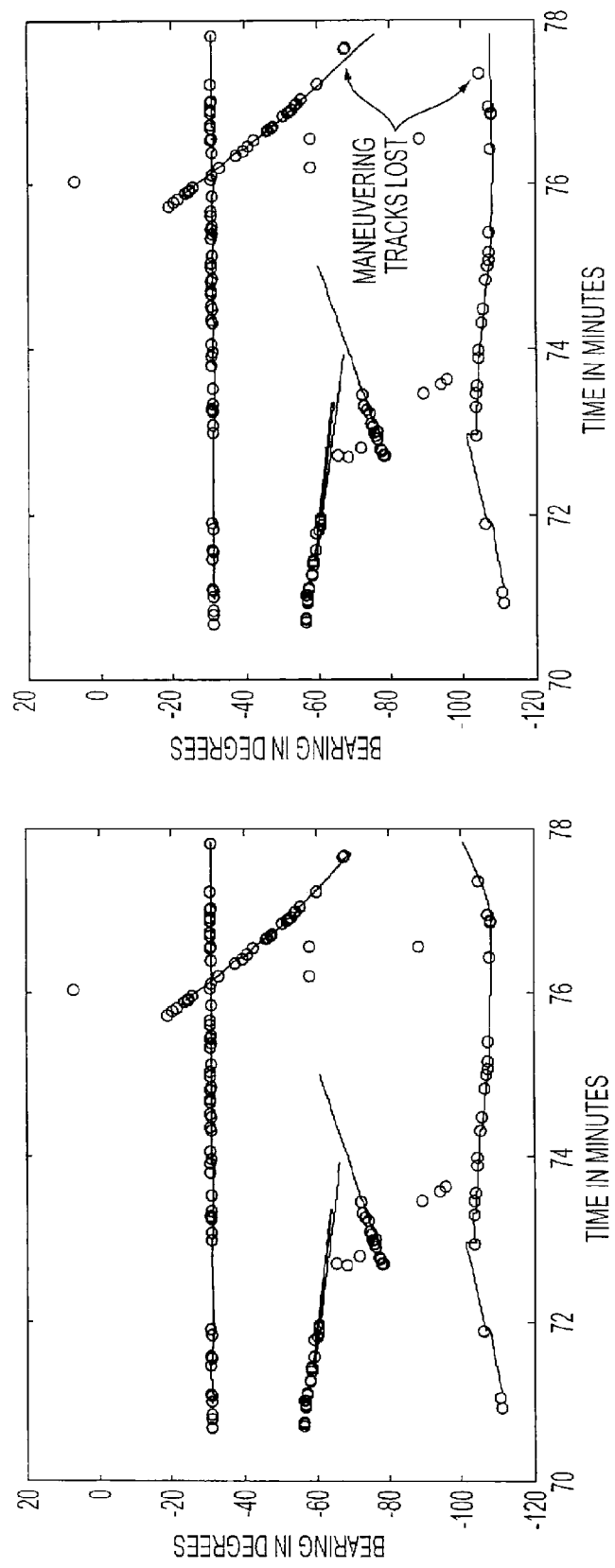
FIG. 12 are two graphs showing tracking results of the system of FIGS. 7 and 8 using the collected data of FIG. 1 and a standard second order filter (right graph) and the ESM tracker described in this invention (left graph)
Figure 13:
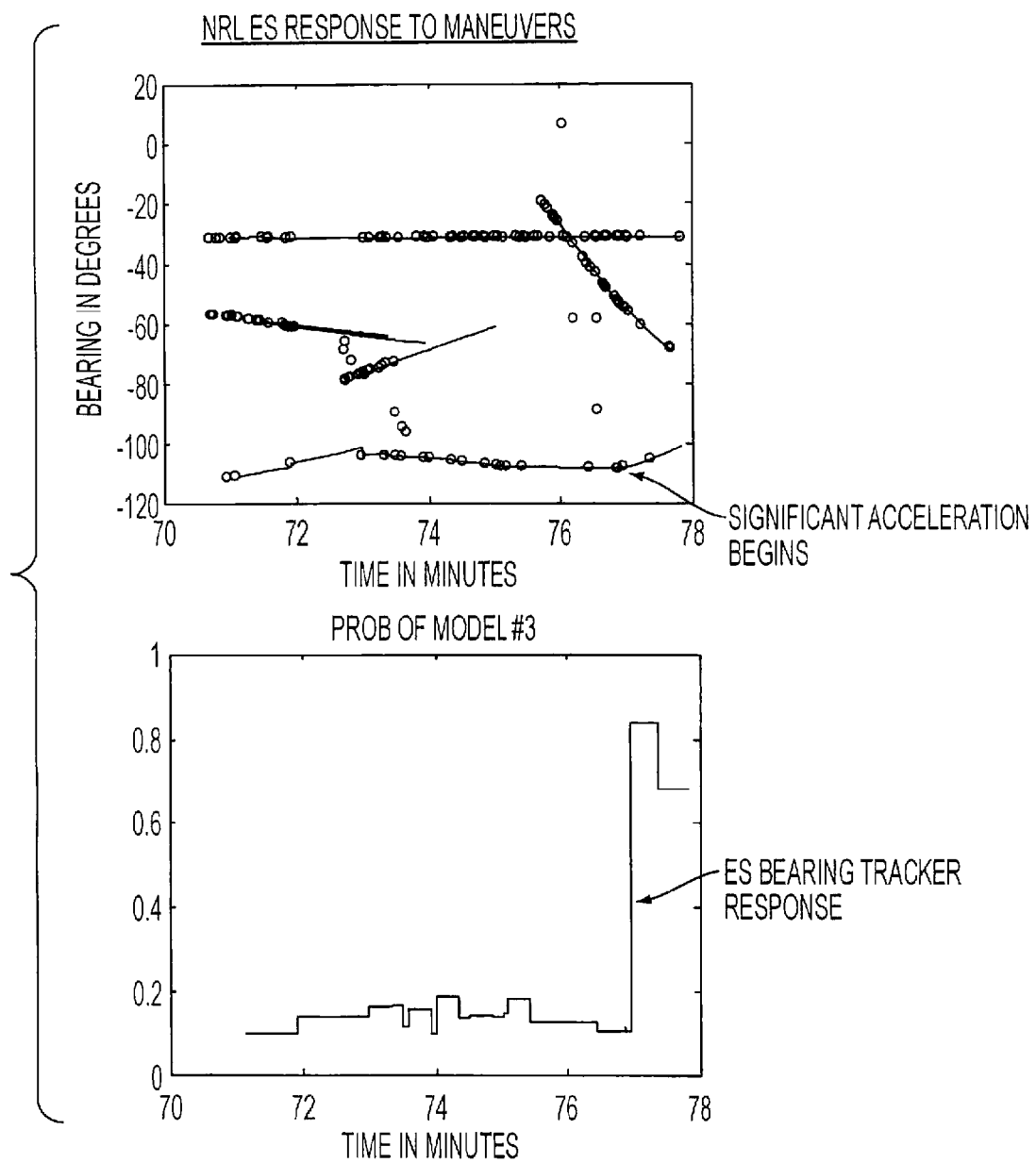
FIG. 13 are two graphs showing the using ESM tracking using the system of FIGS. 7 and 8 (top graph) and the response in probability (bottom graph) indicating switching to the third-order filter using the collected data of FIG. 1.
Figure 14:
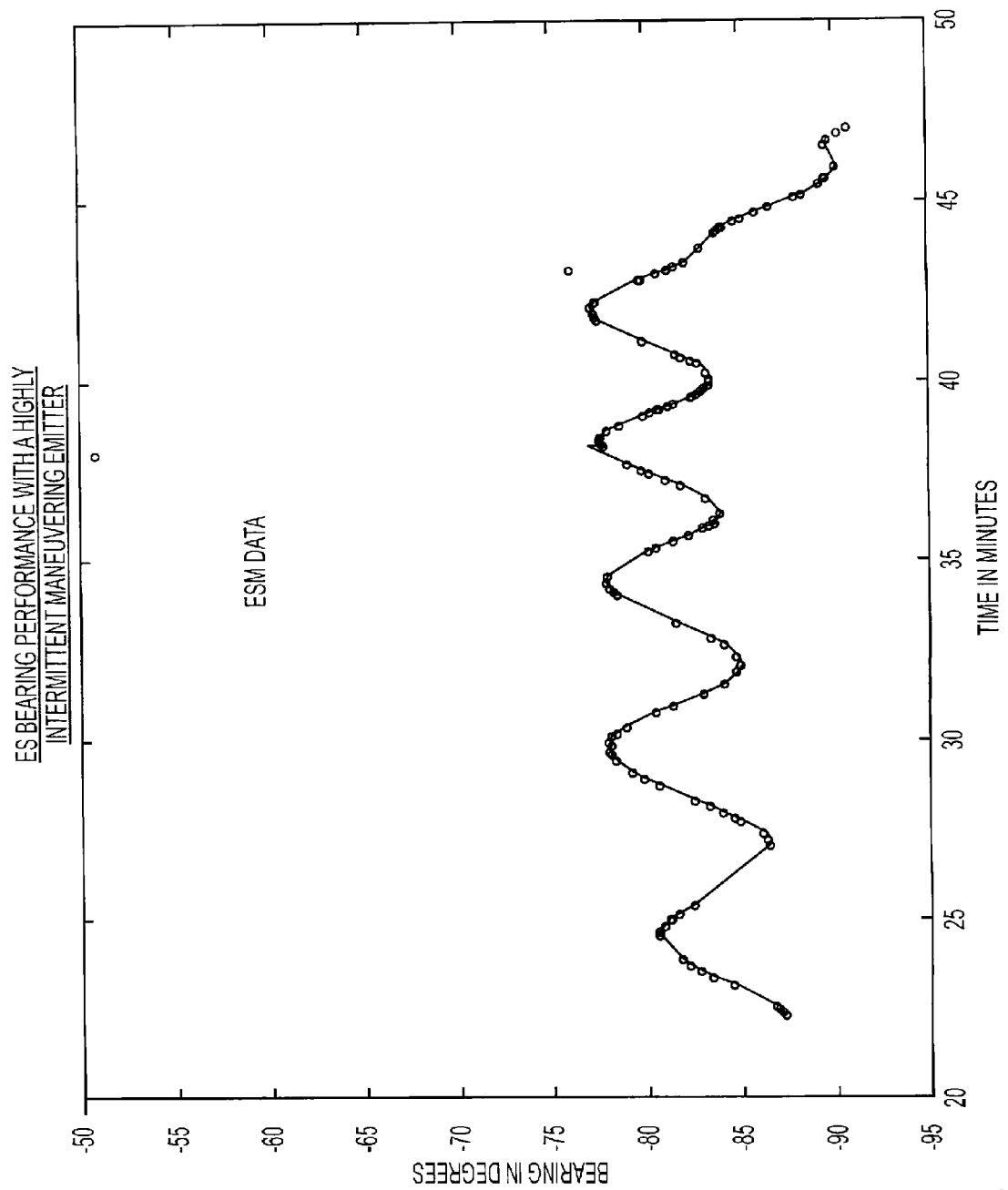
FIG. 14 is a graph showing the ESM tracker of FIGS. 7 and 8 tracking in real-time maneuvering targets in bearing.
Figure 15:
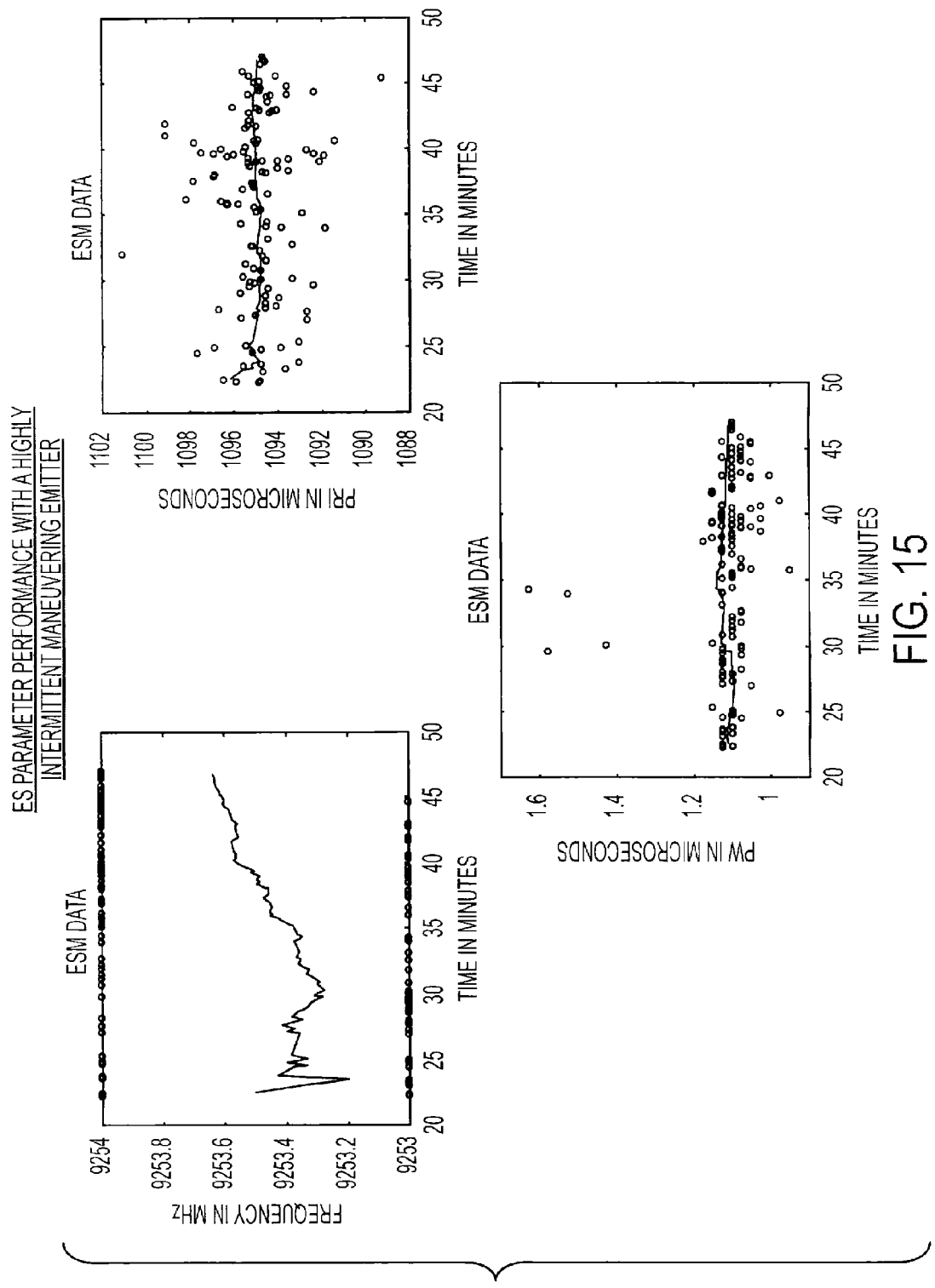
FIG. 15 is a graph showing the ESM tracker of FIGS. 7 and 8 tracking in real-time tracking ES parameters.
Figure 16:
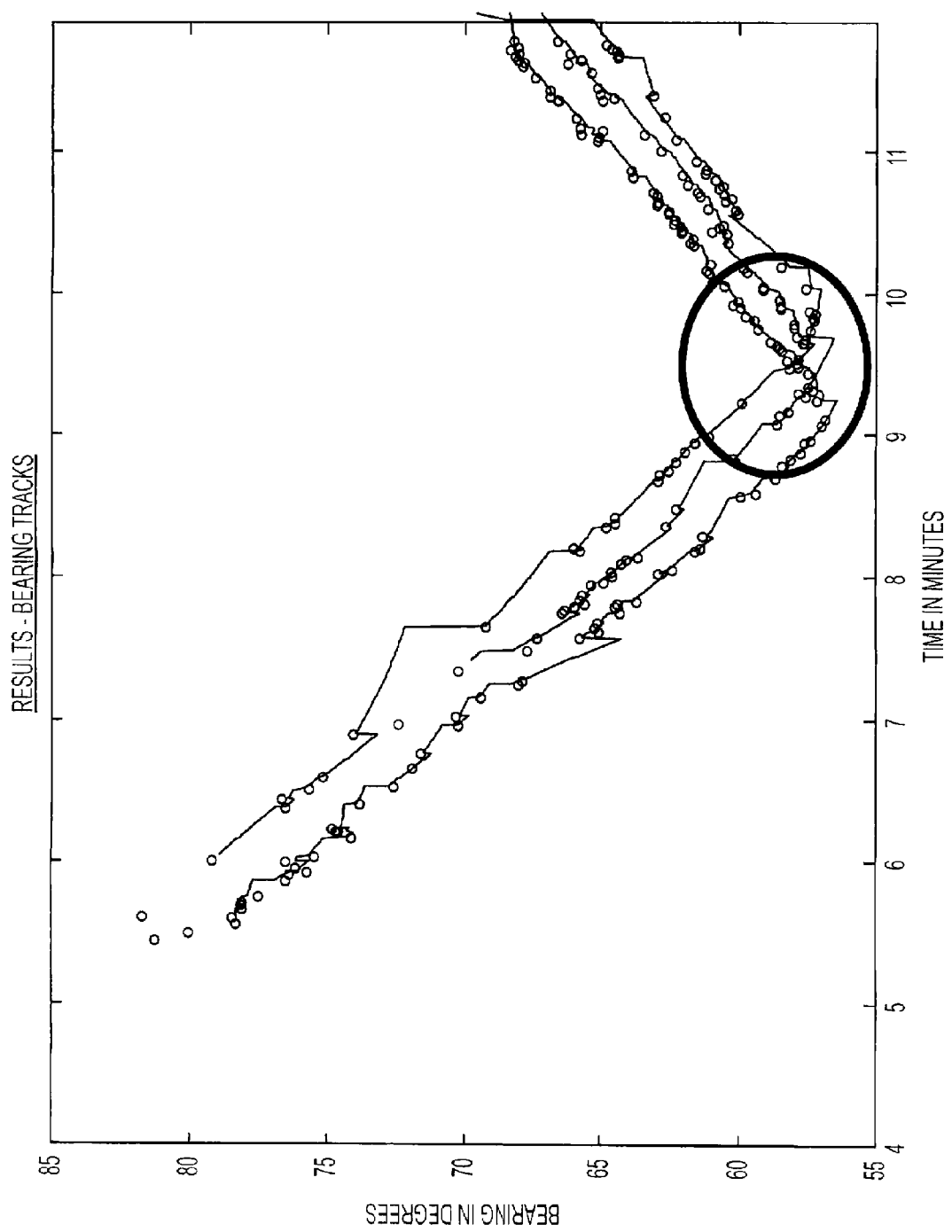
FIG. 16 is a graph showing the ESM tracker of FIGS. 7 and 8 tracking in real-time crossing target data from three targets of interest.
Figure 17:
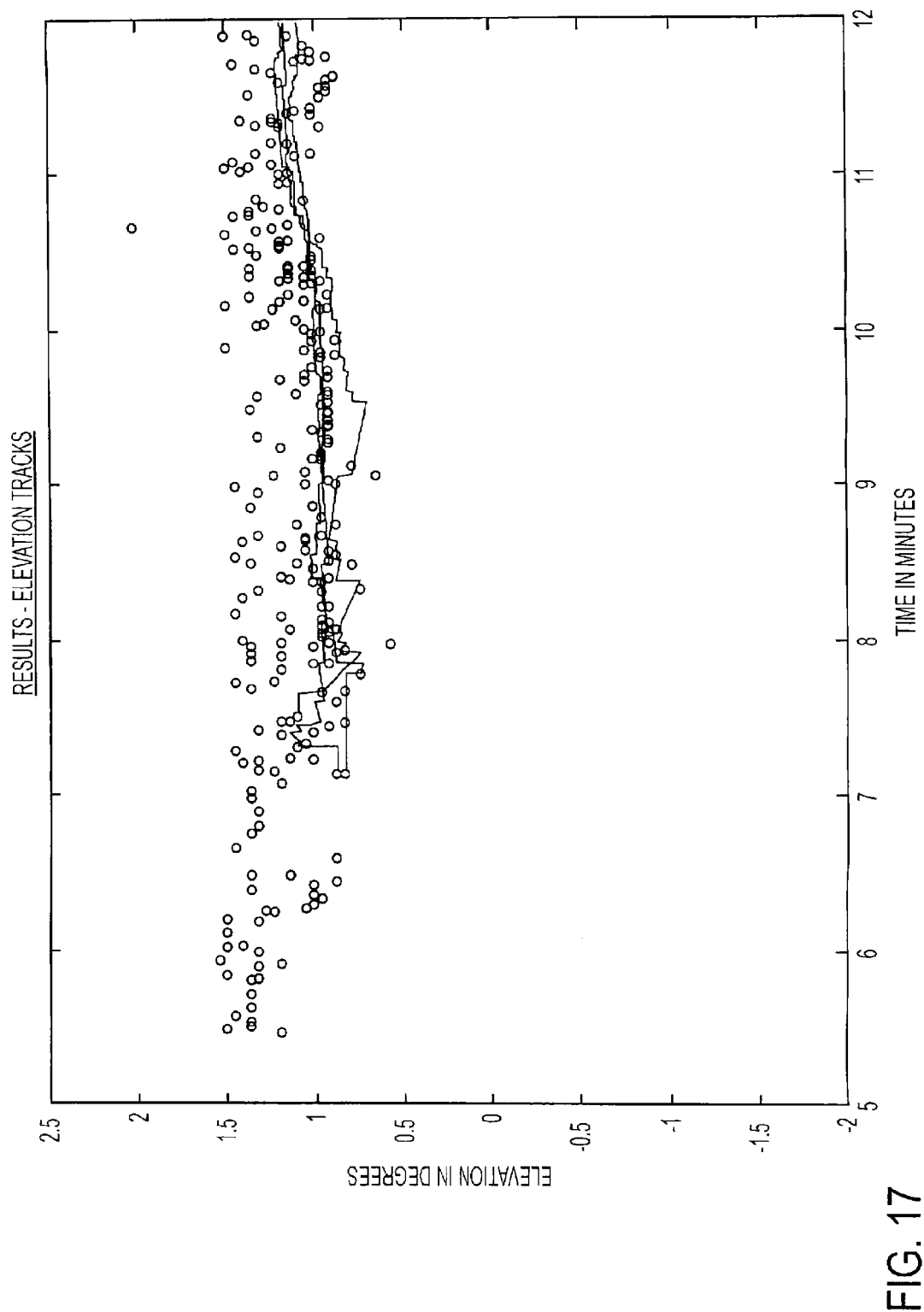
FIG. 17 is a graph showing the ESM tracker of FIGS. 7 and 8 correctly tracking the targets of FIG. 16 in Elevation angle due to the inclusion of tracking in ESM parameter space.
Figure 18:
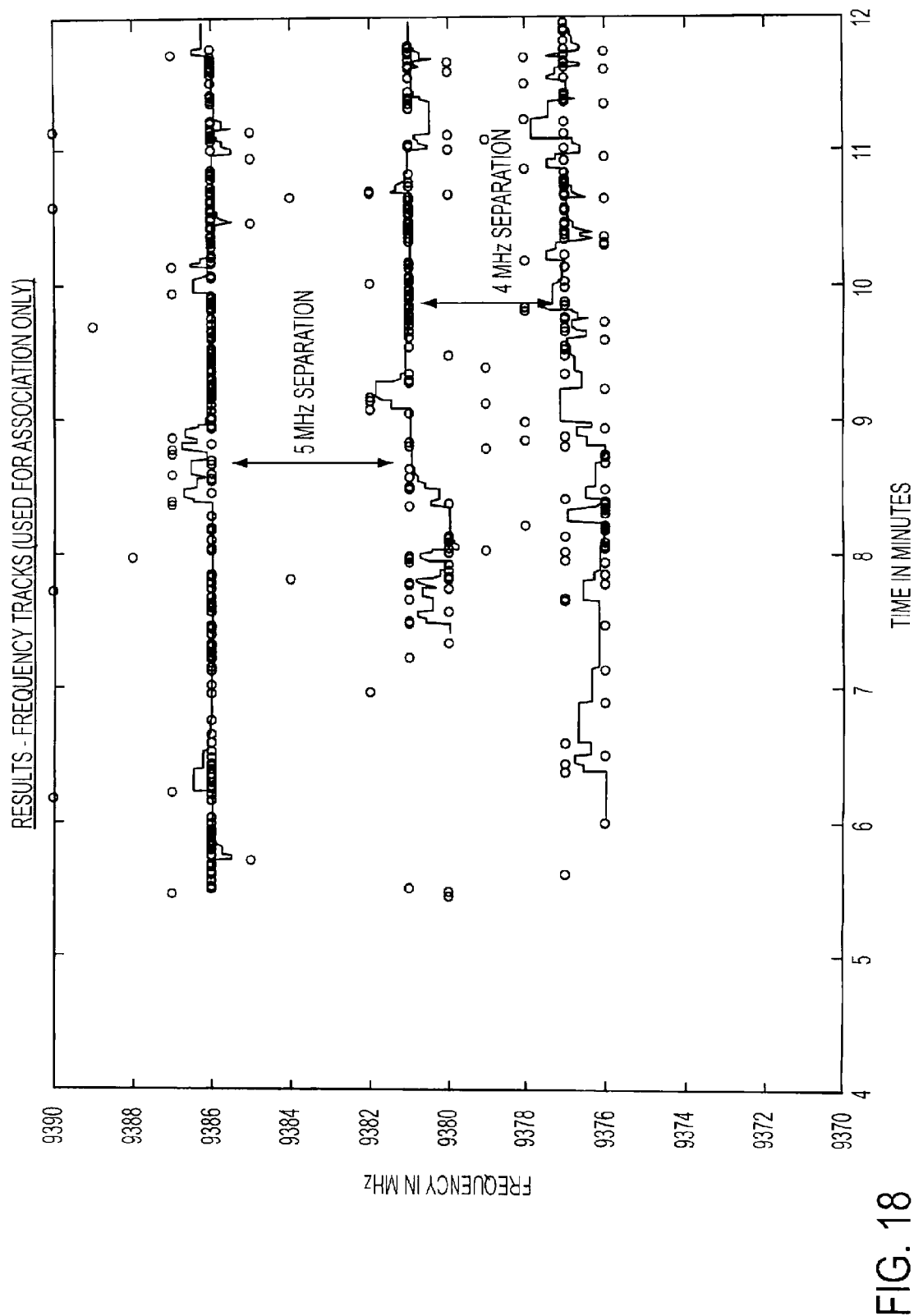
FIGS. 18 and 19 are graphs showing the ES tracker of FIGS. 7 and 8 capability to resolve/separate the three ESM emitters in ESM parameters from the crossing targets (FIG. 16) having the closely spaced elevation contacts (FIG. 17)
Figure 19:
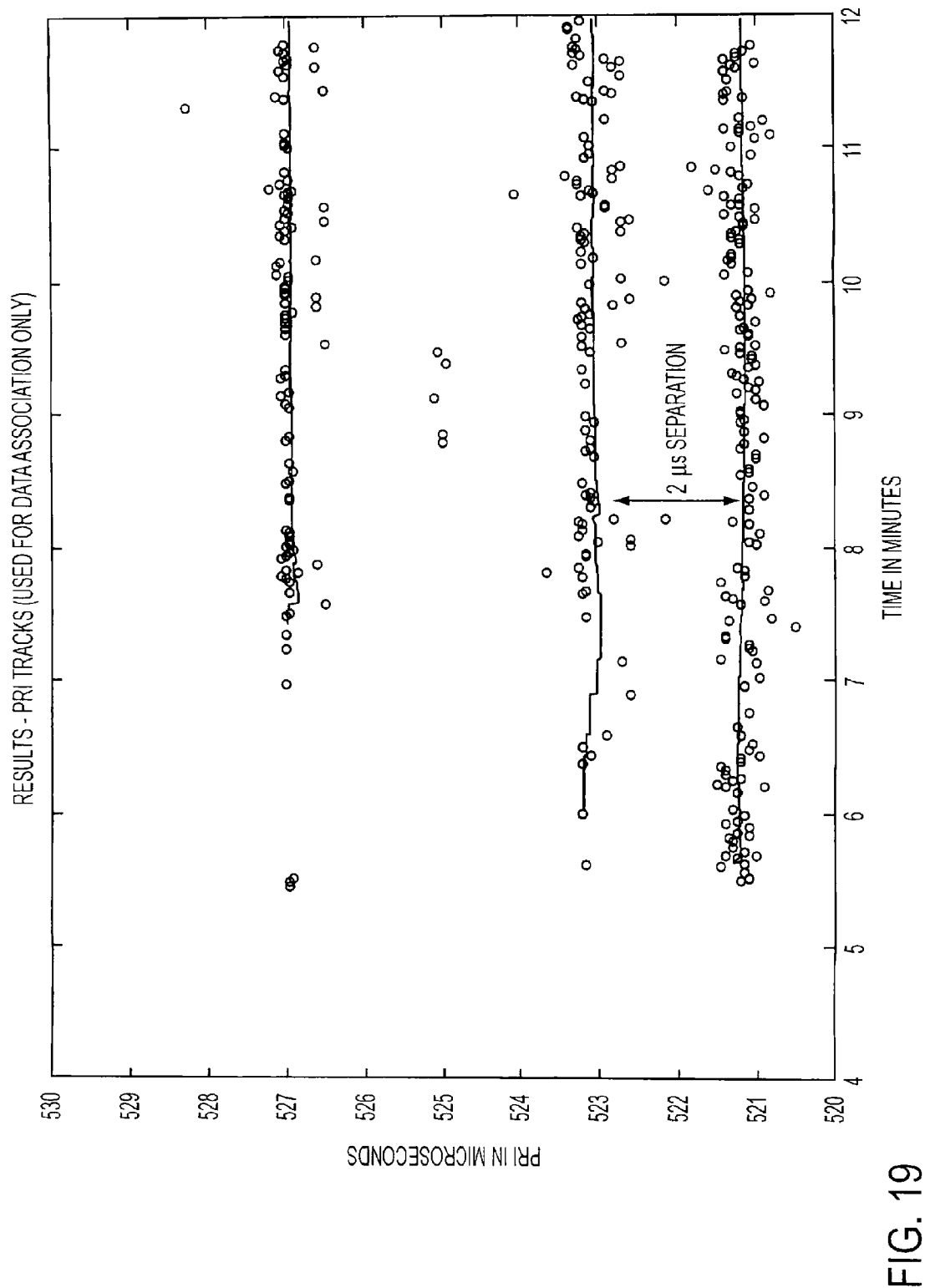
Figure 20:
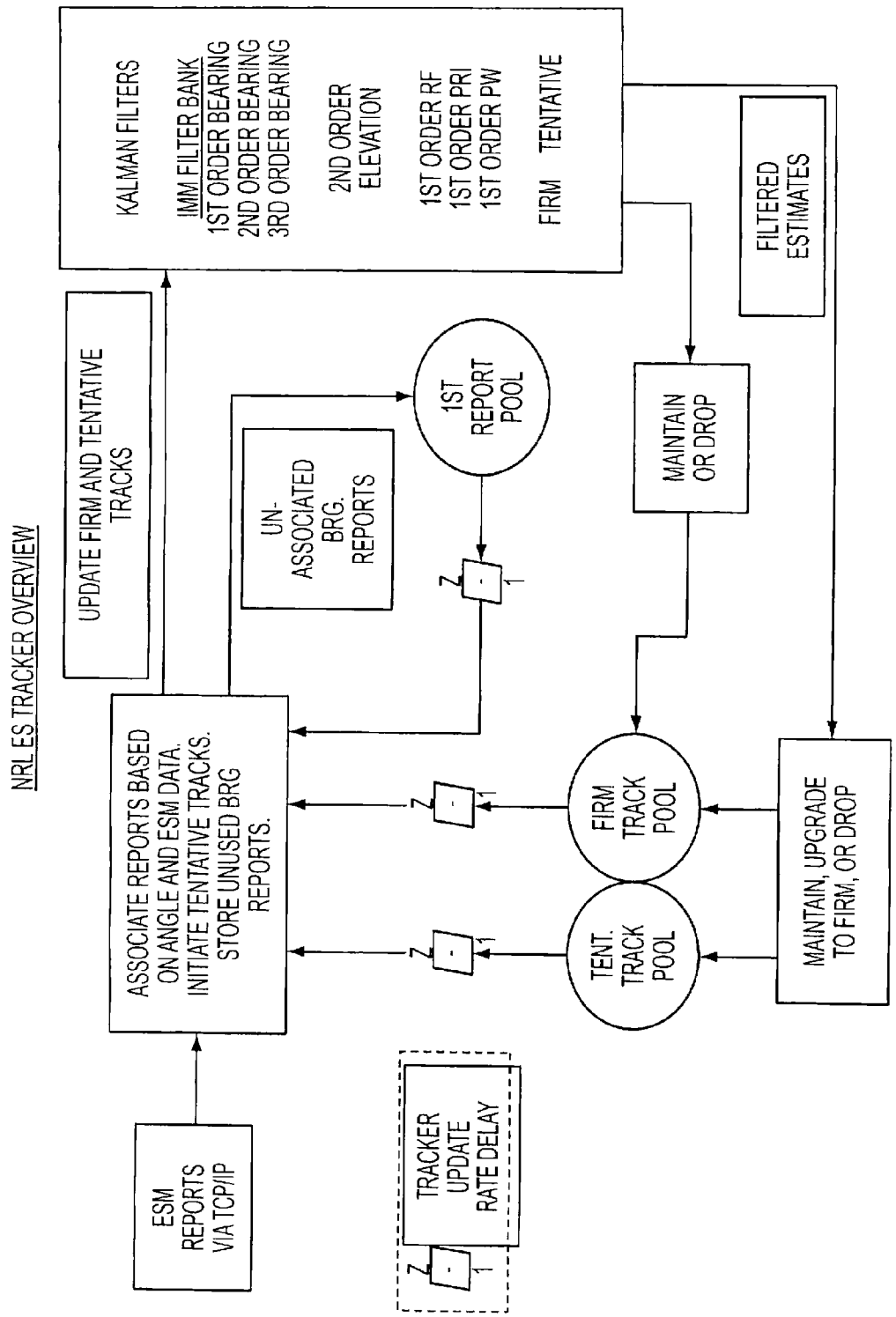
FIG. 20 is a flow diagram of the ESM tracker indicating it uses the IMM bearing filter, the second order Elevation filter as well as the ESM parameters filter in the correlation and association process via the joint likelihood of the entire parameter space.

FIG. 7 shows the ES Tracker invention in a combat system implementation that includes a combat system interface and AEGIS combat radar system. FIG. 8 shows various data transfer configurations/connections of the system of FIG. 7. FIG. 9 shows the real-time results of this combat configuration, and in particular the results of. FIGS. 10-11 show an overlaying in real time, of ESM track data and Link-16 data. FIGS. 10-11 also show a time response where the ES bearing line is following the Link-16 track (the small half circles with the ES bearing lines emanating from the center) in the lower right part of the figure. The Link-16 track is a radar track where the bearing line is from an ES feeding bearing to the ES Tracker. The bearing lines show that for the time elapse. the ESM tracker bearing line followed the radar track indicating success correlating (visually) ES and radar data. FIGS. 12 and 13 show that the IMM tracker (FIG. 12 left) does not lose track (FIG. 12 right) when compared to a standard second-order Kalman filter since as shown in FIG. 13, the IMM switches to the third order filter (Model 3 on the VG) at the need time. FIG. 14 shows the ES tracker's capability to track highly maneuvering targets in bearing even with large amounts of missing and intermittent data. FIG. 15 shows that the ES tracker tracks not only in bearing but also in ES parameters (Frequency, PRI, and Pulsewidth). FIG. 16 shows crossing targets are tracked correctly and FIG. 17 shows that the ES tracker also tracks in Elevation angle. FIGS. 16 and 17 show that for crossing targets (FIG. 16) the closely spaced elevation contacts in FIG. 17 would not be resolved if the three signals were not separable in ES parameter space (shown in FIGS. 18 and 19). This is significant since if tracking, correlation, and association was not carried out in all five dimensions (FIG. 20), the Elevation tracking in FIG. 17 would not be possible since the reports were too closely spaced.

Obviously many modifications and variations of the present invention are possible in the light of the above teachings. It is therefore to be understood that the scope of the invention should be determined by referring to the following appended claims.

What is claimed as new and desired to be protected by Letters Patent of the United States is:

1. An Electronic Support (ES) tracker for tracking an emitter target, comprising:
   a sensor for receiving a signal emitted by the target;
   a sensor processor for processing the signal and outputting a measurement; and an information processor for processing the measurement, including an Interactive Multiple Model (IMM) bearing filter comprising:
- a mixing section for receiving the measurement and producing a mixed output signal; and
- at least one first order Kalman filter for receiving the mixed output signal for basic target tracking;
- at least one second order Kalman filter for receiving the mixed output signal and filtering bearing and bearing rate; and
- at least one third order Kalman filter for receiving the mixed output signal and tracking bearing, bearing rate, and bearing acceleration.

2. A target tracker as in claim 1, further comprising a correlation, association, and score (likelihood) computation that uses mixed spatial and ESM parameter computations as a five dimensional space.

3. A target tracker as in claim 1, further comprising at least one second-order elevation filter for modeling and tracking elevation and elevation rate.

4. A target tracker as in claim 3, further comprising a correlation, association, and score (likelihood) computation that uses mixed spatial and ESM parameter computations as a five dimensional space.

5. A target tracker as in claim 3, further comprising at least one first-order Electronic Support Measures (ESM) parameters filter for modeling and tracking frequency, pulsewidth, and pulse repetition interval (PRI) of an airborne target.

6. A target tracker as in claim 5, further comprising a correlation, association, and score (likelihood) computation that uses mixed spatial and ESM parameter computations as a five dimensional space.

7. A target tracker as in claim 1, wherein the target is an airborne emitter.

8. A target tracker as in claim 1, further comprising an ESM control algorithm that uses estimated spatial trajectory and ESM parameters to feed a front-end ESM system to provide adaptive gating, to remove tracked targets before a deinterleaving process.

9. A target tracker as in claim 1, further comprising a first-order Electronic Support Measures (ESM) parameters filter that adaptively estimates plant noise, for tracking agile frequency, pulsewidth, and pulse repetition interval (PRI) of the emitter target.

10. A method of tracking an emitter target, comprising:
- receiving a signal emitted by the target;
- processing the signal and outputting a measurement; and
- processing the measurement by applying an Interactive Multiple Model (IMM) that includes producing a mixed output signal;
  - inputting the mixed output signal to at least one first order Kalman filter for basic target tracking;
  - inputting the mixed output signal to at least one second order Kalman filter for filtering a bearing and a bearing rate; and
  - inputting the mixed output signal to at least one third order Kalman filter for tracking the bearing, the bearing rate, and a bearing acceleration.

11. A target tracking method as in claim 10, further comprising computing correlation, association, and score (likelihood) using mixed spatial and ESM parameter computations as a five dimensional space.

12. A target tracking method as in claim 10, further comprising at least one second-order elevation filter for modeling and tracking elevation and elevation rate.

13. A target tracking method as in claim 12, further comprising computing correlation, association, and score (likelihood) using mixed spatial and ESM parameter computations as a five dimensional space.

14. A target tracking method as in claim 12, further comprising at least one first-order Electronic Support Measures (ESM) parameters filter for modeling and tracking frequency, pulsewidth, and pulse repetition interval (PRI) of an airborne target.

15. A target tracking method as in claim 14, further comprising computing correlation, association, and score (likelihood) using mixed spatial and ESM parameter computations as a five dimensional space.

16. A target tracking method as in claim 10, wherein the target is an airborne emitter.

17. A target tracker as in claim 10, further comprising applying the target tracker to a linear or non-linear trajectory emitter tracking situation.

18. In an Electronic Support (ES) tracker consisting of a plurality of sensors for receiving a signal emitted by each of a plurality of emitters, a processor for processing each said signal and outputting a corresponding measurement, an information processor for processing each said measurement, and an Interactive Multiple Model (IMM) bearing filter that includes a mixing section for receiving each said measurement and producing a corresponding mixed output signal; the improvement comprising:
- at least one first order Kalman filter for receiving the each said mixed output signal for basic target tracking;
- at least one second order Kalman filter for receiving each said mixed output signal and filtering bearing and bearing rate; and
- at least one third order Kalman filter for receiving each said mixed output signal and tracking bearing, bearing rate, and bearing acceleration.

19. A target tracker as in claim 18, further comprising a correlation, association, and score (likelihood) computation that uses mixed spatial and ESM parameter computations as a five dimensional space.

20. A target tracker system as in claim 18, further comprising at least one second-order elevation filter for modeling and tracking elevation and elevation rate.

21. A target tracker as in claim 20, further comprising a correlation, association, and score (likelihood) computation that uses mixed spatial and ESM parameter computations as a five dimensional space.

22. A target tracker system as in claim 20, further comprising at least one first-order Electronic Support Measures (ESM) parameters filter for modeling and tracking frequency, pulsewidth, and pulse repetition interval (PRI) of an airborne target.

23. A target tracker as in claim 22, further comprising a correlation, association, and score (likelihood) computation that uses mixed spatial and ESM parameter computations as a five dimensional space.

24. A target tracker as in claim 18, wherein at least some of the emitters are airborne emitters.

25. A target tracker as in claim 18, wherein at least some of the emitters are ships.

26. An Electronic Support (ES) tracker for tracking an emitter target, comprising:
- a sensor for receiving a signal emitted by the target;
- a sensor processor for processing the signal and outputting a measurement; and
- an information processor for processing the measurement, including an Interactive Multiple Model (IMM) bearing filter comprising:
  - a mixing section for receiving the measurement and producing a mixed output signal; and
  - a plurality of Kalman filters, at least one having a different order than another, operating in parallel.

27. A target tracker as in claim 26, further comprising a correlation, association, and score (likelihood) computation that uses mixed spatial and ESM parameter computations as a five dimensional space.

28. A target tracker as in claim 26, further comprising at least one second-order elevation filter for modeling and tracking elevation and elevation rate.

29. A target tracker as in claim 28, further comprising a correlation, association, and score (likelihood) computation that uses mixed spatial and ESM parameter computations as a five dimensional space.

30. A target tracker as in claim 28, further comprising at least one first-order Electronic Support Measures (ESM) parameters filter for modeling and tracking frequency, pulse-width, and pulse repetition interval (PRI) of a ship or airborne target.

31. A target tracker as in claim 30, further comprising a correlation, association, and score (likelihood) computation that uses mixed spatial and ESM parameter computations as a five dimensional space.

32. A target tracker as in claim 26, wherein the target is a shipborne or airborne emitter.

* * * * *